US008027688B2

(12) United States Patent
Wu

(10) Patent No.: US 8,027,688 B2
(45) Date of Patent: Sep. 27, 2011

(54) METHOD AND DEVICE OF NETWORK RESOURCE RELEASE PROCESSING

(75) Inventor: Wenfu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/781,580

(22) Filed: May 17, 2010

(65) Prior Publication Data

US 2010/0227621 A1 Sep. 9, 2010

Related U.S. Application Data

(63) Continuation of application No. PCT/CN2009/070143, filed on Jan. 14, 2009.

(30) Foreign Application Priority Data

Jan. 21, 2008 (CN) .......................... 2008 1 0025943
Sep. 8, 2008 (CN) .......................... 2008 1 0215898

(51) Int. Cl.
*H04W 72/00* (2009.01)
(52) U.S. Cl. ...................... 455/450; 455/436; 455/435.1; 709/228; 370/331; 370/395.52; 370/352; 370/353; 370/351; 370/355; 370/356
(58) Field of Classification Search .................. 455/450, 455/436, 435.1; 709/228; 370/331, 395.52, 370/352–356
See application file for complete search history.

(56) References Cited

U.S. PATENT DOCUMENTS

| 2007/0189274 | A1 | 8/2007 | Liu |
| 2007/0213059 | A1 | 9/2007 | Shaheen |
| 2008/0320149 | A1* | 12/2008 | Faccin .......................... 709/228 |
| 2009/0318147 | A1* | 12/2009 | Zhang et al. ............... 455/435.1 |
| 2010/0061308 | A1* | 3/2010 | Becker et al. ................. 370/328 |
| 2010/0323700 | A1* | 12/2010 | Bachmann et al. .......... 455/436 |

FOREIGN PATENT DOCUMENTS

CN 1505413 A 6/2004
(Continued)

OTHER PUBLICATIONS

3GPP TS 23.401 V8.1.0—Technical Specification Group Service and System Aspects; General Packet Radio Service (GPRS) enhancements for Evolved Universal Terrestrial Radio Access Network (E-UTRAN) access (Release 8), Mar. 2008, $3^{rd}$ Generation Partnership Project, Valbonne, France.

(Continued)

*Primary Examiner* — Nimesh Patel
(74) *Attorney, Agent, or Firm* — Leydig, Voit & Mayer, Ltd.

(57) ABSTRACT

A method of network resource release processing is provided, which includes the following steps. After user equipment (UE) using idle mode signaling reduction (ISR) mechanism registers to two 3rd Generation Partnership Project (3GPP) communication networks, when the UE changes from the 3GPP network to a non-3GPP communication network, a serving gateway (Serving GW) receives a message sent from a peer endpoint network element (NE), and deletes network resources established by the two 3GPP communication networks for the UE according to the message. A mobility management NE and a Serving GW are also provided. Through the method and device of network resource release processing, the resources are released when the UE using the ISR mechanism changes from the 3GPP network to the non-3GPP communication network.

4 Claims, 9 Drawing Sheets

FOREIGN PATENT DOCUMENTS

| | | |
|---|---|---|
| CN | 1832447 A | 9/2006 |
| CN | 1984021 A | 6/2007 |
| CN | 101060709 A | 10/2007 |
| CN | 101448294 B | 5/2011 |
| EP | 1978770 A1 * | 10/2008 |
| KR | 20040051328 A | 6/2004 |
| WO | WO 2007/111860 A2 | 10/2007 |
| WO | WO 2007/111860 A3 | 10/2007 |

OTHER PUBLICATIONS

Rejection Decision in corresponding Chinese Application No. 200810215898.9 (Apr. 14, 2010).

$3^{rd}$ Office Action in corresponding Chinese Application No. 200810215898.9 (Nov. 19, 2010).

Extended European Search Report in corresponding European Application No. 09704402.8 (Nov. 5, 2010).

Written Opinion of the International Searching Authority in corresponding PCT Application No. PCT/CN2009/070143 (Apr. 23, 2009).

"S2-073506—Idle mode Signalling Reduction description," 3GPP TSG SA WG2 Meeting #59, Aug. 27-31, 2007, $3^{rd}$ Generation Partnership Project, Helsinki, Finland.

"S2-073981—Procedure of ISR Deactivation," 3GPP TSG SA WG2 Meeting #60, Oct. 8-12, 2007, $3^{rd}$ Generation Partnership Project, Kobe, Japan.

"3GPP TS 23.060—Technical Specification Group Services and System Aspects; General Packet Radio Service (GPRS); Service description; Stage 2 (Release 7)," Sep. 2007, Version 7.5.0, $3^{rd}$ Generation Partnership Project, Valbonne, France.

3GPP TS 23.401—Technical Specification Group Services and System Aspects; GPRS enhancements for E-UTRAN access (Release 8), Sep. 2007, Version 1.2.1, $3^{rd}$ Generation Partnership Project, Valbonne, France.

"3GPP TS 23.401—Technical Specification Group Services and System Aspects; GPRS enhancements for E-UTRAN access (Release 8)," Nov. 2007, Version 1.4.1, $3^{rd}$ Generation Partnership Project, Valbonne, France.

"3GPP TS 23.402—Technical Specification Group Services and System Aspects; Architecture Enhancements for non-3GPP accesses (Release 8)," Nov. 2007, Version 1.5.1, $3^{rd}$ Generation Partnership Project, Valbonne, France.

"3GPP TS 29.213—Technical Specification Group Core Network and Terminals; Policy and Charging Control signalling flows and QoS parameter mapping; (Release 7)," Sep. 2007, Version 7.2.0, $3^{rd}$ Generation Partnership Project, Valbonne, France.

State Intellectual Property Office of the People's Republic of China, First Examination report in Chinese Patent Application No. 200810215898.9 (Sep. 4, 2009).

State Intellectual Property Office of the People's Republic of China, Second Examination report in Chinese Patent Application No. 200810215898.9 (Dec. 25, 2009).

State Intellectual Property Office of the People'S Republic of China, International Search Report in International Patent Application No. PCT/CN2009/070143 (Apr. 23, 2009).

* cited by examiner

METHOD AND DEVICE OF NETWORK RESOURCE RELEASE PROCESSING

CROSS-REFERENCE TO RELATED APPLICATIONS

This application is a continuation of International Application No. PCT/CN2009/070143, filed on Jan. 14, 2009, which claims priorities to Chinese Patent Application No. 200810025943.4, filed on Jan. 21, 2008 and Chinese Patent Application No. 200810215898.9, filed on Sep. 8, 2008, all of which are hereby incorporated by reference in their entireties.

FIELD OF THE TECHNOLOGY

The present invention relates to the field of electronic communication, and more particularly to a method of network resource release processing, a mobility management network element (NE), and a serving gateway (Serving GW).

BACKGROUND OF THE INVENTION

Along with the development of communication technology, in order to enhance the competitiveness of future networks, the 3rd Generation Partnership Project (3GPP) is researching a brand-new evolution network. Referring to FIG. 1, a system architecture of the evolution network includes the following.

An evolved universal mobile telecommunications system (UMTS) territorial radio access network (E-UTRAN) is configured to implement radio-related functions of the evolution network. A mobility management entity (MME) takes charge of mobility management of control plane, which includes management of user context and mobility state, and assignment of a user temporary identity. A serving gateway (Serving GW) is a user plane anchor point between 3GPP communication networks, and terminates the interface towards E-UTRAN. A packet data network gateway (PDN GW) is a user plane anchor point between the 3GPP communication network and a non-3GPP communication network, and terminates the interface towards the external PDN. A policy and charging rule function (PCRF) is configured to perform functions including policy control decision and flow based charging control. A home user server (HSS) is configured to store subscription information of user.

A UMTS territorial radio access network (UTRAN) and a global system for mobile communication/enhanced data rates for GSM evolution (GSM/EDGE) radio access network (GERAN) are configured to implement the radio-related functions in the existing general packet radio service (GPRS)/UMTS network. A serving GPRS supporting node (SGSN) is configured to implement routing forward, mobility management, session management, user information storage, and other functions in the GPRS/UMTS network.

Non-3GPP Internet Protocol communication networks (non-3GPP IP Access) are communication networks defined by the non-3GPP organizations, for example, a wireless local area network (WLAN), a worldwide interoperability for microwave access (WiMAX), and a code division multiple access (CDMA) network.

An authentication, authorization and accounting server (AAA server) is configured to execute access authentication, authorization, and accounting functions on user equipment (UE).

In order to reduce mobility management process of the UE among the different communication networks, for example, reduce the process of the inter system mobility between the GERAN/UTRAN and the E-UTRAN (inter 3GPP access system mobility), recently, an idle mode signaling reduction (ISR) mechanism is used in the 3GPP communication network.

In the prior art, when the user using the ISR mechanism moves to another New MME, the New MME needs to acquire context information of the UE from an Old SGSN and an Old MME. Then, the New MME judges whether the UE uses the ISR mechanism, and notifies the HSS of using situation of the ISR mechanism. The HSS then notifies the Old MME to detach the user.

During the implementation of the present invention, the inventor finds that the processing processes are the specific processing processes in the 3GPP communication network. When the UE moves to the non-3GPP communication network, the specific processing processes in the 3GPP communication network cannot be processed in the non-3GPP communication network, that is, resources of the UE in the 3GPP communication network cannot be released.

SUMMARY OF THE INVENTION

The present invention is directed to a method of network resource release processing, a mobility management NE, and a Serving GW, so as to release resources when a UE using an ISR mechanism changes from a 3GPP communication network to a non-3GPP communication network.

In an embodiment, the present invention provides a method of network resource release processing, which includes the following steps.

After a UE using ISR mechanism registers to two 3GPP communication networks, when the UE changes from the 3GPP network to a non-3GPP communication network, a Serving GW receives a message sent from a peer endpoint NE, and deletes network resources established by the two 3GPP communication networks for the UE according to the message.

Correspondingly, in an embodiment, the present invention provides a Serving GW, which includes a first message receiving unit and a processing unit.

The first message receiving unit is configured to receive a message including indication information sent from a peer endpoint NE.

The processing unit is configured to delete network resources established by 3GPP communication networks for a UE according to the message received by the first message receiving unit.

Correspondingly, in an embodiment, the present invention provides a mobility management NE, which includes a second message receiving unit, a resource releasing unit, and a message sending unit.

The second message receiving unit is configured to receive a handover complete message sent from a non-3GPP communication network.

The resource releasing unit is configured to release resources established by 3GPP communication networks for a UE after the second message receiving unit receives the handover complete message.

The message sending unit is configured to send a message including indication information to a Serving GW, and notify the Serving GW to release the network resources established for the UE.

Through the method and device of resource release processing when the UE using the ISR mechanism changes to the non-3GPP communication network according to the embodiments of the present invention, the problem of the prior art that the user using the ISR mechanism cannot perform processes after moving from the 3GPP communication network to the non-3GPP communication network is solved, and the network resources occupied by the user are released when the UE using the ISR mechanism changes from the 3GPP communication network to the non-3GPP communication network, thereby improving system processing capability and ensuring quality of service (QoS) for the user.

DETAILED DESCRIPTION OF THE EMBODIMENTS

The present invention provides a method of network resource release processing, which includes the following steps. After a UE using ISR mechanism registers to two 3GPP communication networks, when the UE changes (including being handed over) from the 3GPP communication network to a non-3GPP communication network (particularly, the UE moves to the non-3GPP network, the UE initiates a processing process of attaching to the non-3GPP network in the non-3GPP network, or the UE initiates the processing process of attaching to the non-3GPP network in the 3GPP network), a Serving GW receives a message sent from a peer endpoint NE, and deletes network resources established by the two 3GPP communication networks for the UE according to information included in the message.

The message sent from the peer endpoint NE received by the Serving GW includes, but not limited to, the following two manners.

In a manner 1, when the peer endpoint NE is a PDN GW, the message sent from the peer endpoint NE is a delete bearer request message or a binding revocation indication message.

In a manner 2, when the peer endpoint NE is a mobility management NE of the 3GPP communication network, the message sent from the peer endpoint NE is the delete bearer request message or a delete Packet Data Protocol (PDP) context request message.

The manner 2 particularly includes the following manners.

In manner 2.1, an HSS triggers the mobility management NE of the 3GPP communication network to send the delete bearer request message or the delete PDP context request message to the Serving GW.

In manner 2.2, the non-3GPP communication network triggers the mobility management NE of the 3GPP communication network to send the delete bearer request message or the delete PDP context request message to the Serving GW.

In the following, technical solutions of the method of resource release processing when the UE using the ISR mechanism changes from the 3GPP communication network to the non-3GPP communication network, the mobility management NE, and the Serving GW are described in detail with accompanying drawings.

In the manner 1, when the peer endpoint NE is the PDN GW, the message sent from the peer endpoint NE is the delete bearer request message or the binding revocation indication message.

Figure 1:
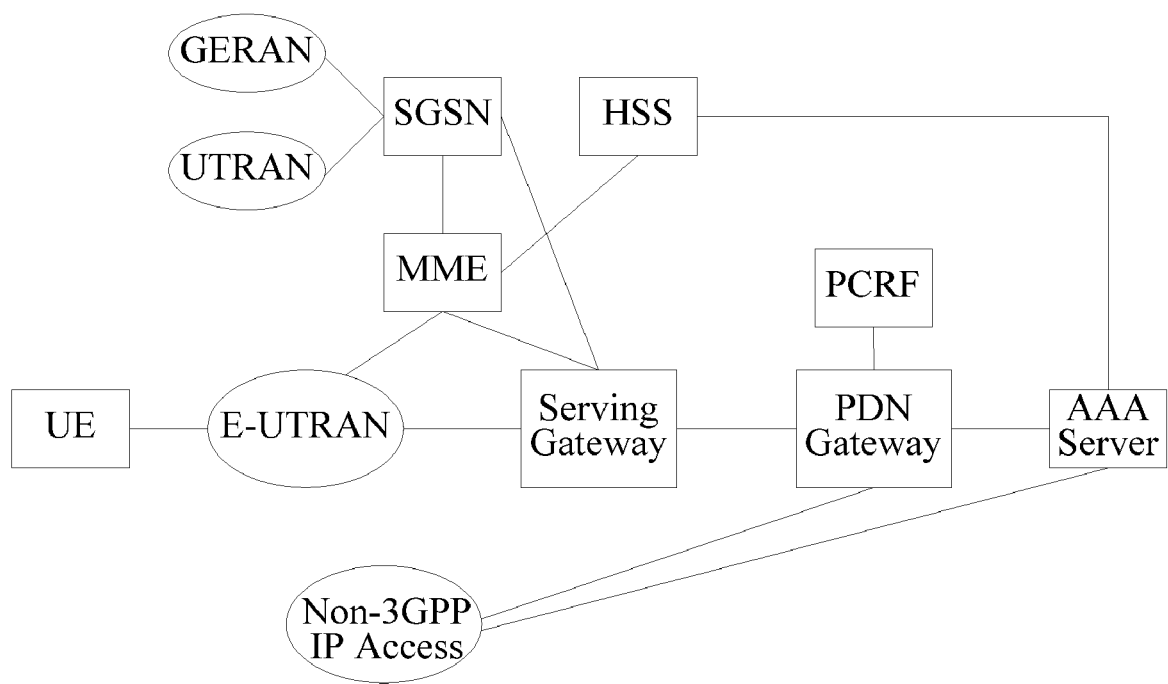
FIG. 1 is a system architectural view of an evolution network provided in a 3GPP.
Figure 2:
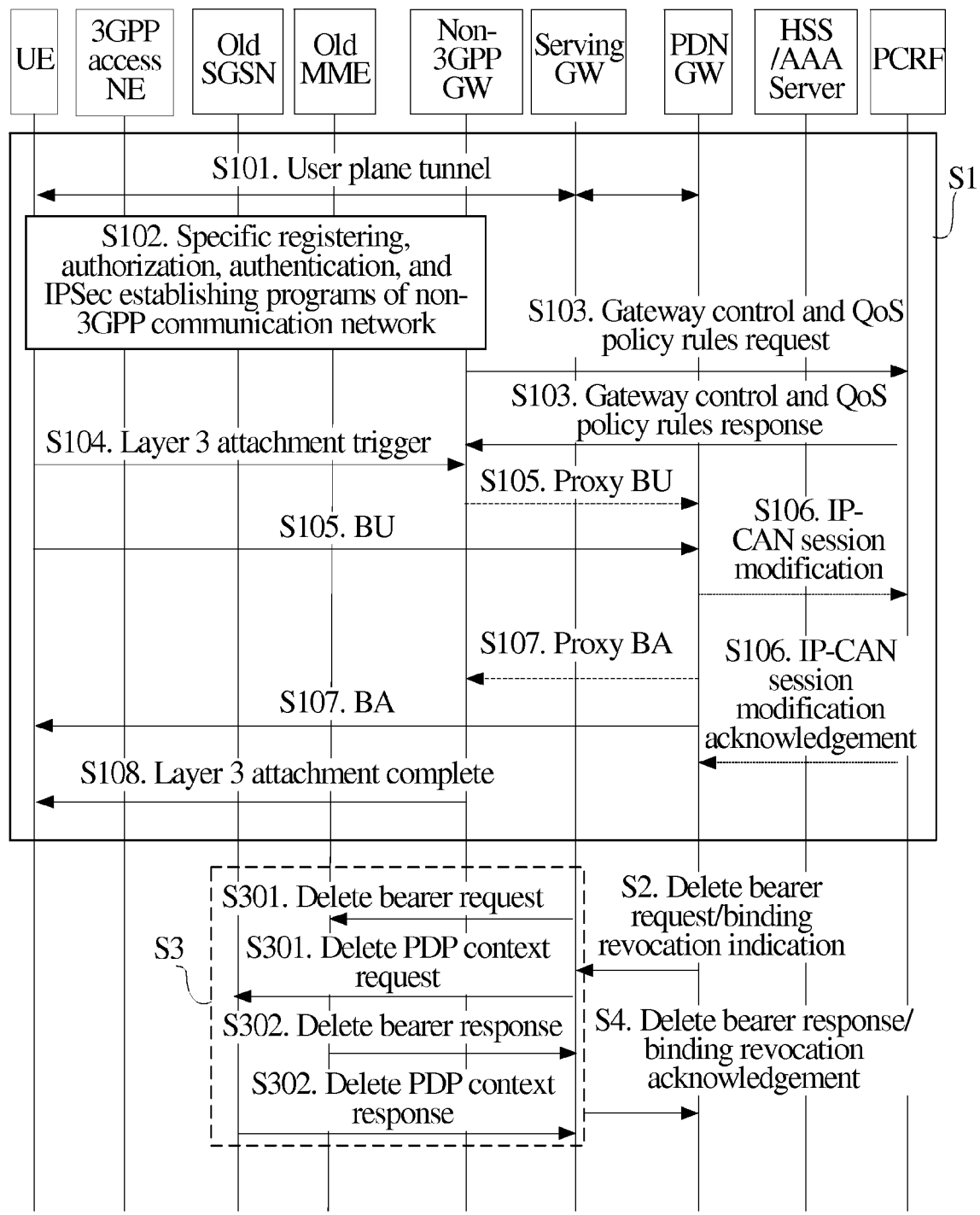
FIG. 2 is a flow chart of a first embodiment of a method of network resource release processing according to the present invention.

FIG. 2 is a flow chart of a first embodiment of the method of network resource release processing according to the present invention. Referring to FIG. 2, in this embodiment, for mobility management NEs of two 3GPP communication networks, a mobility management NE of a second 3GPP communication network is an Old SGSN, and a mobility management NE of a first 3GPP communication network is an Old MME. When a UE using ISR mechanism in the 3GPP communication network moves from the 3GPP network to a non-3GPP network, a PDN GW performs a resource release process. The method includes the following steps.

In Step S1, the UE performs a service process in the 3GPP network, and initiates an attach session negotiation procedure when moving from the 3GPP communication network to the non-3GPP communication network.

In Step S2, the PDN GW sends a message to a Serving GW, in which when interface protocol between the Serving GW and the PDN GW is GPRS Tunneling Protocol (GTP), the message is a delete bearer request message, and when the interface protocol between the Serving GW and the PDN GW is Proxy Mobile Internet Protocol (PMIP), the message is a binding revocation indication message. The PDN GW may include first indication information in the delete bearer request message or the binding revocation indication message, the first indication information is configured to indicate that a communication network of the UE changes from the 3GPP communication network to the non-3GPP network, that is, the delete bearer request message or the binding revocation indication message is caused by that the UE changes from the 3GPP communication network to the non-3GPP communication network. A particular manner of processing the indication information is described as follows.

A Cause IE is set to a specific cause value (for example, Inter RAT Change from 3GPP to non-3GPP), so as to indicate that the process is caused by that the UE changes from the 3GPP communication network to the non-3GPP communication network.

Alternatively, a specific indication bit IE (for example, Inter RAT Change from 3GPP to non-3GPP) is set, so as to indicate that the process is caused by that the UE changes from the 3GPP communication network to the non-3GPP communication network.

Alternatively, a Delete Type or a Revocation Type IE is set to a specific value (for example, 1), so as to identify that the process is caused by that the UE changes from the 3GPP communication network to the non-3GPP communication network.

In Step S3, after receiving the delete bearer request or the binding revocation indication message, according to the first indication information in the message, the Serving GW judges that the UE changes from the 3GPP communication network to the non-3GPP communication network, and the Serving GW finds that the UE uses the ISR mechanism, so the Serving GW decides to deactivate the ISR mechanism of the UE (that is, the Serving GW decides that the UE does not use the ISR mechanism in the 3GPP communication network and the non-3GPP communication network), performs a session negotiation on the resource release process with the 3GPP communication network, and releases the resources of the UE in the 3GPP.

It should be noted that when the PDN GW does not include the first indication information in the delete bearer request or the binding revocation indication message, and after the Serving GW finds that all bearers of the UE are requested to be released by the PDN GW, the Serving GW considers that the bearer release is caused by that the UE changes from the 3GPP communication network to the non-3GPP communication network.

In Step S4, after completing the session negotiation with the 3GPP communication network, the Serving GW releases the resources (including user plane resources and control plane resources) of the UE in the 3GPP communication networks on the Serving GW, and returns a response message, for example, a delete bearer response message or a bind revocation acknowledgement message, to the PDN GW.

After receiving the response message, the PDN GW releases the 3GPP network resources of the UE on the PDN GW, reserves the resources in the target non-3GPP communication network, and at the same time reserves resources assigned by the PDN GW for the UE, such as an IP address.

Referring to FIG. 2, the attach session negotiation procedure in Step S1 particularly includes the following steps.

In Step S101, the UE registers to the Old MME of the first 3GPP communication network and the Old SGSN of the second 3GPP communication network, uses the ISR mechanism between the Old SGSN and the Old MME, and performs the service process through the Serving GW and the PDN GW.

In Step S102, the UE moves to the non-3GPP communication network, and executes a specific attachment procedure, and authorization and authentication programs of the non-3GPP communication network through the non-3GPP communication network.

In Step S103, a non-3GPP GW sends a Gateway control and QoS policy rules request message to a PCRF to acquire a policy and charging control (PCC) rule used by the UE in the non-3GPP communication network. The PCRF returns a Gateway control and QoS policy rules response message to the non-3GPP GW, in which the message includes the PCC rule used by the UE in the non-3GPP communication network.

In this step, for a WLAN system, the non-3GPP GW is an evolved packet data gateway (EPDG), for a WiMAX system, the non-3GPP GW is an access service network gateway (ASN GW), for a CDMA system, the non-3GPP GW is an access gateway (AGW), and for a high rate packet data (HRPD) network, the non-3GPP GW is a packet data serving node (PDSN).

Note: the PDSN is described to be an HRPD Serving gateway (HRPD Serving GW) in some protocols.

In Step S104, the UE triggers a Layer 3 attachment procedure.

In Step S105, if interface between the non-3GPP GW and PDN GW uses the PMIP protocol, the non-3GPP GW sends a proxy binding update (BU) message to the PDN GW. If interface between the UE and the PDN GW uses a Client Mobile Internet Protocol (CMIP), the UE sends a BU message to the PDN GW.

In Step S106, after receiving the message, the PDN GW acquires the PCC rule of the UE saved in the GW, and judges whether the PCC rule is relevant to an access type of an IP-connectivity access network (IP-CAN). If yes, the PDN GW sends an IP-CAN session modification request message to the PCRF to acquire the PCC rule used by the UE in the non-3GPP communication network. The PCRF returns an IP-CAN session modification acknowledgement message to the PDN GW, in which the message includes the PCC rule used by the UE in the non-3GPP communication network.

In Step S107, the PDN GW returns a proxy binding acknowledgement (BA) message to the non-3GPP GW, or the PDN GW returns the BA message to the UE.

In Step S108, the non-3GPP GW indicates the UE that the Layer 3 attachment is completed.

Referring to FIG. 2, Step S3 particularly includes the following steps.

In Step S301, after the Serving GW judges that the UE changes from the 3GPP communication network to the non-3GPP communication network according to the first indication information in the message sent from the PDN GW, the Serving GW sends the delete bearer request message or the delete PDP context request message to the Old MME of the first 3GPP communication network and the Old SGSN of the second 3GPP communication network. The Serving GW may include the first indication information in the delete bearer request message or the delete PDP context request message, so as to indicate that the delete bearer request message or the delete PDP context request message is caused by that the UE changes from the 3GPP communication network to the non-3GPP communication network. The particular manner of processing the first indication information is described as follows.

A Cause IE is set to a specific cause value (for example, Inter RAT Change from 3GPP to non-3GPP), so as to indicate that the process is caused by that the UE changes from the 3GPP communication network to the non-3GPP communication network.

Alternatively, a specific indication bit IE (for example, Inter RAT Change from 3GPP to non-3GPP) is set, so as to indicate that the process is caused by that the UE changes from the 3GPP communication network to the non-3GPP communication network.

Alternatively, a Delete Type IE is set to a specific value (for example, 1), so as to identify that the process is caused by that the UE changes from the 3GPP communication network to the non-3GPP communication network.

The Serving GW may also include second indication information in the delete bearer request message or the delete PDP context request message, so as to indicate that the delete bearer request message or the delete PDP context request message is caused by that the ISR mechanism of the UE is deactivated. A particular manner of processing the second indication information is described as follows.

A Cause IE is set to a specific cause value (for example, ISR Deactive), so as to indicate that the delete bearer request message or the delete PDP context request message is caused by that the ISR mechanism of the UE is deactivated.

Alternatively, a specific indication bit IE or an identity IE (for example, ISR Deactive) is set, so as to indicate that the delete bearer request message or the delete PDP context request message is caused by that the ISR mechanism of the UE is deactivated.

Alternatively, a Delete Type IE is set to a specific value (for example, 2), so as to identify that the delete bearer request message or the delete PDP context request message is caused by that the ISR mechanism of the UE is deactivated.

In Step S302, after receiving the delete bearer request message or the delete PDP context request message sent from the Serving GW, the Old SGSN and the Old MME finds that the communication network of the UE changes from the 3GPP communication network to the non-3GPP communication network or the ISR mechanism of the UE is deactivated according to the first indication information or the second indication information, the Old SGSN and the Old MME release the resources of the UE in the 3GPP networks. The process is described as follows.

The UE is detached, and a state of the UE is set to an "EMM-DEREGISTERED" state.

If the state of the UE is an activated state or a connected state in the Old SGSN or the Old MME, the Old SGSN and the Old MME notify the NEs of the 3GPP communication networks to release the resources (including a connection resource and a bearer resource).

Alternatively, if the state of the UE is an idle state in the Old SGSN or the Old MME, the Old SGSN and the Old MME do not trigger a paging process, and directly delete the resources locally.

The Old SGSN and the Old MME return the delete bearer response message or the delete PDP context response message to the Serving GW.

It should be noted that when the Serving GW does not include the first indication information or the second indication information in the delete bearer request message or the delete PDP context request message, and after the Old MME and the Old SGSN find that all the bearers of the UE are requested to be released by the Serving GW, the Old MME and the Old SGSN consider that the bearer release is caused by that the UE changes from the 3GPP communication network to the non-3GPP network or the ISR mechanism of the UE is deactivated.

In the above steps, if the Old SGSN or the Old MME finds that the UE registers to a mobile switching center (MSC), in which the MSC mainly provides circuit switching calling function and mobility management function for mobile users, when the MME or the SGSN detaches the UE, and the detaching of the UE is caused by that the UE changes from the 3GPP communication network to the non-3GPP communication network, the Old SGSN or the Old MME sends an international mobile user identity (IMSI) detach indication message to the MSC, so as to indicate the MSC to detach the UE.

Figure 3:
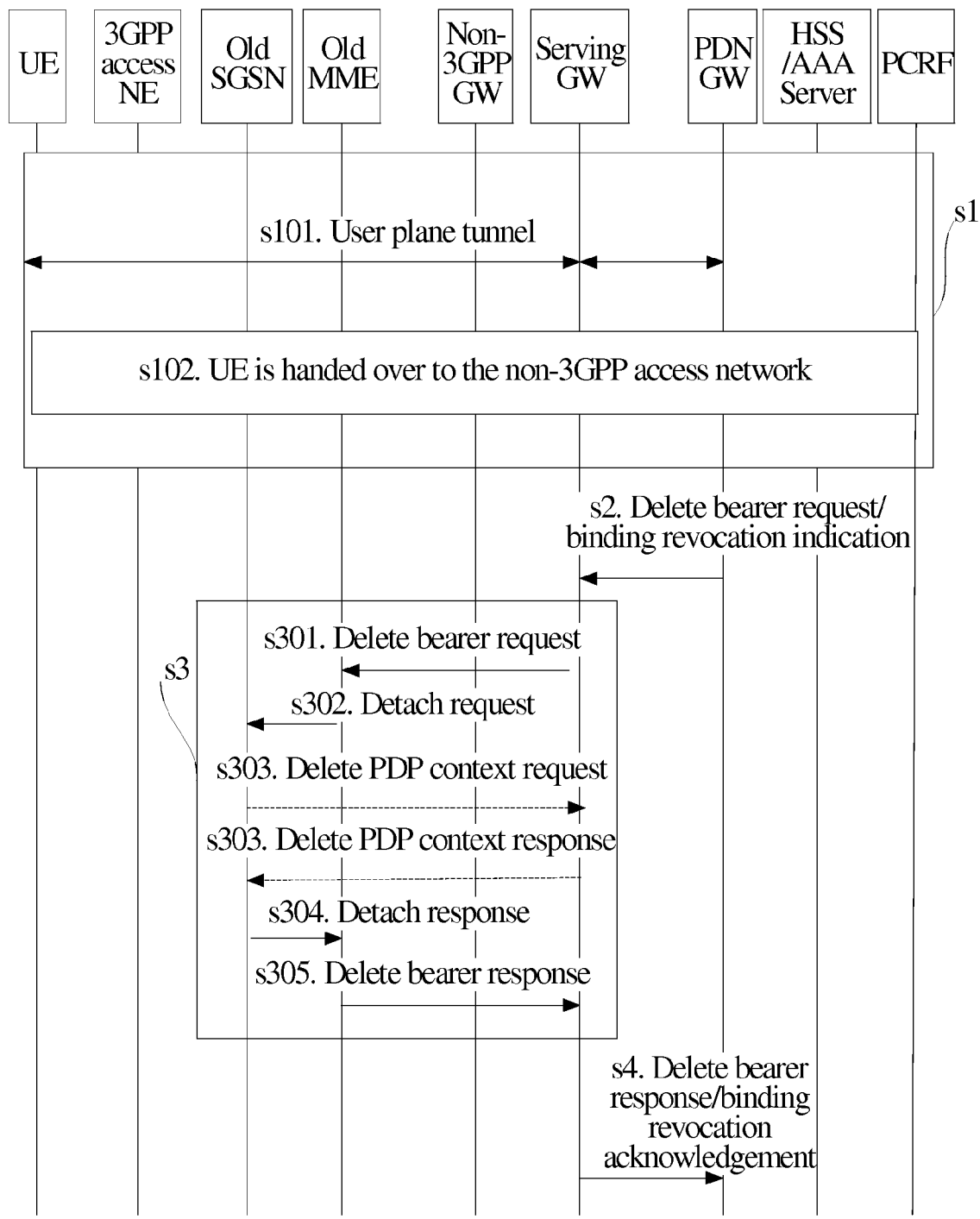
FIG. 3 is a flow chart of a second embodiment of the method of network resource release processing according to the present invention.

FIG. 3 is a flow chart of a second embodiment of the method of network resource release processing according to the present invention. Referring to FIG. 3, in this embodiment, a mobility management NE of a second 3GPP communication network is an Old SGSN, and a mobility management NE of a first 3GPP communication network is an Old MME. After a UE using ISR mechanism moves from the 3GPP network to a non-3GPP network, the UE initiates an attachment procedure through the non-3GPP network. Then, a resource release process is performed. The method includes the following steps.

In Step s1, the UE performs a service process in the 3GPP communication network, and initiates an attach session negotiation procedure when moving from the 3GPP communication network to the non-3GPP communication network. The Step s1 includes the following steps.

In Step s101, the UE registers to the Old MME of the first 3GPP communication network and the Old SGSN of the second 3GPP communication network, uses the ISR mechanism between the Old SGSN and the Old MME, and performs the service process through the Serving GW and the PDN GW.

In Step s102, the UE moves to the non-3GPP communication network, and executes a specific attachment procedure, and authorization and authentication programs of the non-3GPP communication network through the non-3GPP communication network. The subsequent process is the same as Steps S103-108 of the first embodiment, so it is not described here.

In Step s2, the PDN GW sends a message to a Serving GW, in which when interface protocol between the Serving GW and the PDN GW is a GTP protocol, the message is a delete bearer request message, and when the interface protocol between the Serving GW and the PDN GW is a PMIP protocol, the message is a binding revocation indication message. The PDN GW may include first indication information in the message, the first indication information is configured to indicate that a communication network of the UE changes from the 3GPP communication network to the non-3GPP network, that is, the delete bearer request message or the binding revocation indication message is caused by that the UE changes from the 3GPP communication network to the non-3GPP communication network. A particular manner of processing the indication information is the same as the description in Step S2 of the first embodiment, so it is not described here.

In Step s3, after receiving the delete bearer request or the binding revocation indication message, the Serving GW judges that the UE changes from the 3GPP communication network to the non-3GPP communication network according to the first indication information in the message (when the PDN GW does not include the first indication information in the delete bearer request or the binding revocation indication message, and after the Serving GW finds that all bearers of the UE are requested to be released by the PDN GW, the Serving GW considers that the bearer release is caused by that the UE changes from the 3GPP communication network to the non-3GPP communication network), the Serving GW performs a session negotiation on the resource release process with the 3GPP communication network, and releases the resources of the UE in the 3GPP. The step particularly includes the following steps.

In Step s301, the Serving GW sends the delete bearer request message or the delete PDP context request message to the Old MME of the first 3GPP communication network or the Old SGSN of the second 3GPP communication network. The Serving GW may include the first indication information or second indication information in the delete bearer request message or the delete PDP context request message. The particular manner of processing the first indication information or the second indication information is the same as the description in Step S301 of the first embodiment, so it is not described here.

It should be noted that in the embodiment of the present invention, the process that the Serving GW sends the delete bearer request message or the delete PDP context request message to the Old SGSN of the second 3GPP communication network is the same as the process that the Serving GW sends the delete bearer request message or the delete PDP context request message to the Old MME of the first 3GPP communication network. In this embodiment, only the process that the Serving GW sends the delete bearer request message to the Old MME of the first 3GPP communication network is set as an example for description. The situation that the Serving GW sends the delete bearer request message to the Old SGSN is not described here.

In Step s302, after receiving the delete bearer request message sent from the Serving GW, according to the first indication information or the second indication information, the Old MME of the first 3GPP communication network finds that the bearer delete is caused by that the UE changes from the 3GPP communication network to the non-3GPP communication network or the ISR mechanism of the UE is deactivated (when the Serving GW does not include the first indication information or the second indication information in the delete bearer request, and after the Old MME of the first 3GPP communication network finds that all bearers of the UE are requested to be released by the Serving GW, the Old MME of the first 3GPP communication network considers that the bearer release is caused by that the UE changes from the 3GPP communication network to the non-3GPP communication network or the ISR mechanism of the UE is deactivated), and the Old MME of the first 3GPP communication network finds that the UE uses the ISR mechanism, the Old MME of the first 3GPP communication network deactivates the ISR mechanism of the UE, and notifies the Old SGSN of the second 3GPP communication network to detach the user and release the resources. The Old MME may send a detach request message to the Old SGSN of the second 3GPP communication network to notify the Old SGSN to detach the user and release the resources. The Old MME may include the first indication information or the second indication information in the detach request message. A particular manner of processing the first indication information is described as follows.

A Cause IE is set to a specific cause value (for example, Inter RAT Change from 3GPP to non-3GPP), so as to indicate that the detach request message is caused by that the UE changes from the 3GPP communication network to the non-3GPP communication network.

Alternatively, a specific indication bit IE (for example, Inter RAT Change from 3GPP to non-3GPP) is set, so as to indicate that the detach request message is caused by that the UE changes from the 3GPP communication network to the non-3GPP communication network.

Alternatively, a Delete Type IE is set to a specific value (for example, 1), so as to identify that the detach request message is caused by that the UE changes from the 3GPP communication network to the non-3GPP communication network.

The second indication information is configured to indicate that the request message is caused by that the ISR mechanism of the UE is deactivated. The particular process is described in detail as follows.

The Cause IE is set to a specific cause value (for example, ISR Deactive), so as to indicate that the detach request message is caused by that the ISR mechanism of the UE is deactivated.

Alternatively, a specific indication bit IE or an identity IE (for example, ISR Deactive) is set, so as to indicate that the detach request message is caused by that the ISR mechanism of the UE is deactivated.

Alternatively, the Delete Type IE is set to a specific value (for example, 2), so as to identify that the detach request message is caused by that the ISR mechanism of the UE is deactivated.

It should be noted that the Old MME may also send other messages to notify the Old SGSN to detach the user and release the resources, for example, the Old MME sends a delete resource request or a detach indication message to the Old SGSN to notify the Old SGSN to detach the user and release the resources.

In Step s303, after the Old SGSN of the second 3GPP communication network receives the detach request message, the following process is performed.

When the detach request message does not include the indication information indicating that the detach request is caused by that the UE changes from the 3GPP communication network to the non-3GPP communication network or the ISR is deactivated, the Old SGSN sends the delete PDP context request (or the delete bearer request) message to the Serving GW, and after receiving a PDP context response (or a delete bearer response) returned from the Serving GW, the Old SGSN locally detaches the user and deletes the bearer context resources, and sets a state of the UE to an "EMM-DEREGISTERED" state.

Alternatively, when the detach request message includes the indication information indicating that the detach request is caused by that the UE changes from the 3GPP communication network to the non-3GPP communication network or the ISR is deactivated, and the Serving GW releases all the resources without being notified by the Old SGSN of the resource release, the Old SGSN does not send the delete PDP context request (or the delete bearer request) message to the Serving GW, but locally detaches the user and deletes the bearer context resources, and sets the state of the UE to the "EMM-DEREGISTERED" state.

Alternatively, when the detach request message includes the indication information indicating that the detach request is caused by that the UE changes from the 3GPP communication network to the non-3GPP communication network or the ISR is deactivated, and the Serving GW releases all the resources after being notified by the Old SGSN of the resource release, the Old SGSN sends the delete PDP context request (or the delete bearer request) message to the Serving GW, and after receiving the PDP context response (or the delete bearer response) returned from the Serving GW, the Old SGSN locally detaches the user and deletes the bearer context resources, and sets the state of the UE to the "EMM-DEREGISTERED" state.

In Step s304, the Old SGSN sends a detach response message to the Old MME.

In Step s305, after receiving the detach response message, the Old SGSN locally detaches the user and deletes the bearer context resources (the Old SGSN may also release the bearer context resources after receiving the delete bearer request message sent from the Serving GW), sets the state of the UE to the "EMM-DEREGISTERED" state, and returns a delete bearer response message to the Serving GW.

In step s4, after completing the session negotiation with the 3GPP communication networks, the Serving GW releases the resources (including user plane resources and control plane resources) of the UE in the 3GPP communication networks on the Serving GW, and returns the delete bearer response message or a bind revocation acknowledgement message to the PDN GW.

After receiving the delete bearer response message or the bind revocation acknowledgement message, the PDN GW releases the 3GPP network resources of the UE on the PDN GW, reserves the resources in the target non-3GPP communication network, and at the same time reserves resources assigned by the PDN GW for the UE, such as an IP address.

In this embodiment, when the Serving GW finds that the bearer delete is caused by that the UE changes from the 3GPP communication network to the non-3GPP communication network, and the Serving GW finds that the UE uses the ISR mechanism, the Serving GW has the following process manners.

After receiving the delete bearer response message sent from the Old MME, the Serving GW releases all the resources of the UE in the Serving GW, in which the resources include the user plane resources and the control plane resources (for example, the bearer context, and the control plane resources of the Serving GW towards the Old MME and the Old SGSN), and the Old SGSN needs not to notify the bearer resource release.

Alternatively, the Serving GW deactivates the ISR mechanism of the UE, deletes the resources (for example, the control plane resource of the Serving GW towards the Old MME) in the Serving GW relevant to the Old MME, but the Serving GW does not delete the bearer context used by the UE, and does not delete the control plane resource of the Serving GW towards the Old SGSN. The Serving GW releases all the resources (for example, the bearer context and the control plane resource of the Serving GW towards the Old SGSN) of the UE in the Serving GW after receiving the delete bearer request message sent from the Old SGSN.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

In the manner 2.1, the HSS triggers the mobility management NE of the 3GPP communication network to send the delete bearer request message or the delete PDP context request message to the Serving GW.

Figure 4:
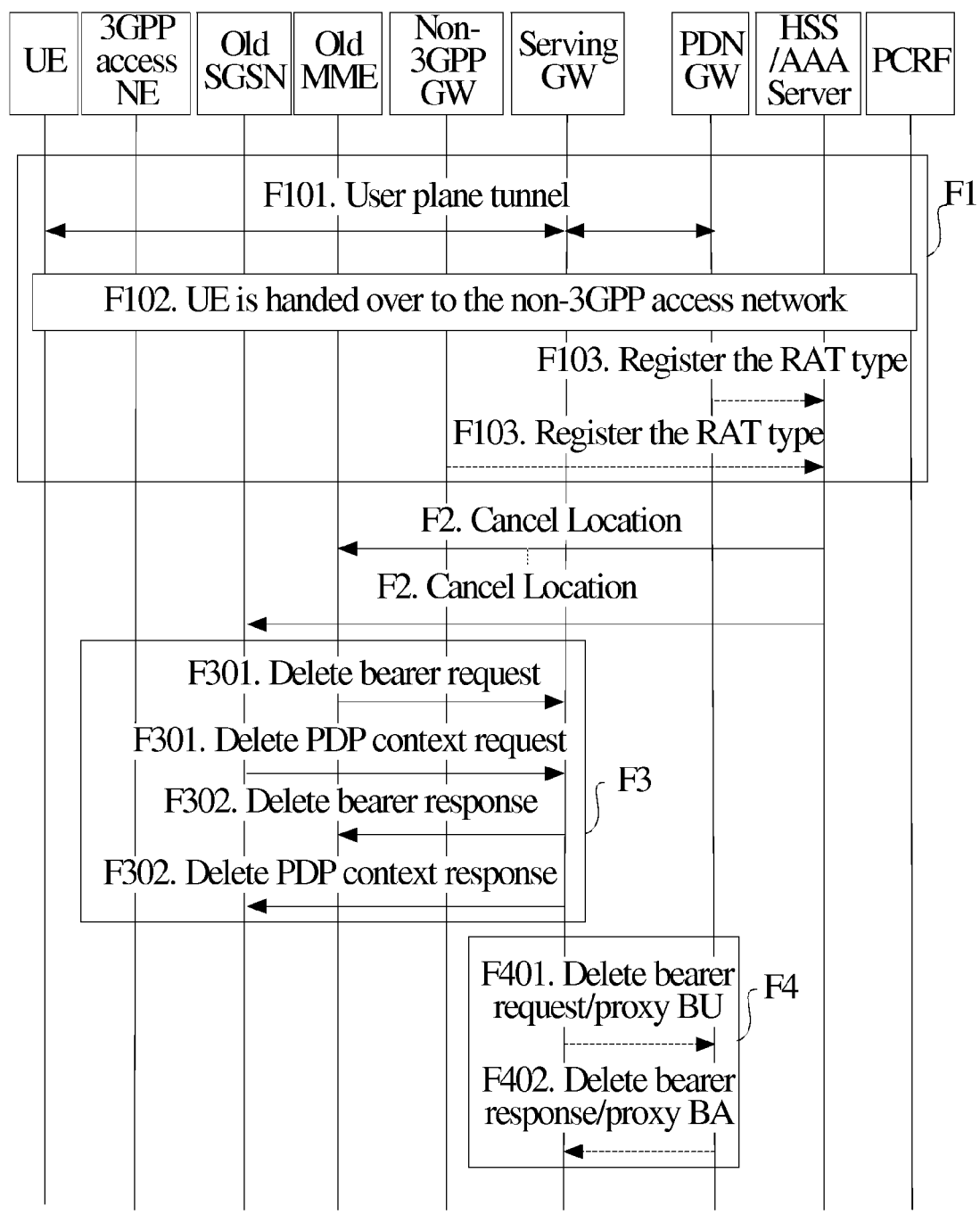
FIG. 4 is a flow chart of a third embodiment of the method of network resource release processing according to the present invention.

FIG. 4 is a flow chart of a third embodiment of the method of network resource release processing according to the present invention. Referring to FIG. 4, in this embodiment, a mobility management NE of a first 3GPP communication network is an Old SGSN, and a mobility management NE of a second 3GPP communication network is an Old MME. The method includes the following steps.

In Step F1, a UE performs a service process in the 3GPP communication network, and initiates an attach session negotiation procedure when moving from the 3GPP communication network to the non-3GPP communication network. The Step F1 includes the following steps.

In Step F101, the UE registers to the Old SGSN of the first 3GPP communication network and the Old MME of the second 3GPP communication network, uses the ISR mechanism between the Old SGSN and the Old MME, and performs the service process through a Serving GW and a PDN GW.

In Step F102, the UE moves to the non-3GPP communication network, and executes a specific attachment procedure, and authorization and authentication programs of the non-3GPP communication network. The subsequent process is the same as Steps S103-108 of the first embodiment, so it is not described here.

In Step F103, the PDN GW or a non-3GPP GW registers a radio access network type (RAT type) of the non-3GPP communication network used by the UE to an HSS through an AAA server.

In Step F2, the HSS finds that the RAT Type of the UE changes to the RAT type of the non-3GPP communication network, and the HSS finds that the UE uses the ISR mechanism, or the HSS finds that the Old SGSN of the first 3GPP communication network and the Old MME of the second 3GPP communication network register to the HSS, the HSS decides to detach the UE from the Old MME and the Old SGSN (that is, the HSS decides that the UE does not use the ISR mechanism in the 3GPP communication network and the non-3GPP communication network), and sends a cancel location message to the Old MME of the second 3GPP communication network and the Old SGSN of the first 3GPP communication network. The HSS may include first indication information in the cancel location message, in which the first indication information is configured to indicate that a communication network of the UE changes from the 3GPP communication network to the non-3GPP communication network, that is, the cancel location message is caused by that the UE changes from the 3GPP communication network to the non-3GPP communication network. A particular manner of processing the first indication information is described as follows.

A Cause IE is set to a specific cause value (for example, Inter RAT Change from 3GPP to non-3GPP), so as to indicate that the Cancel Location is caused by that the UE changes from the 3GPP communication network to the non-3GPP communication network.

Alternatively, a specific indication bit IE (for example, Inter RAT Change from 3GPP to non-3GPP) is set, so as to indicate that the Cancel Location is caused by that the UE changes from the 3GPP communication network to the non-3GPP communication network.

Alternatively, a Cancellation Type IE is set to a specific value (for example, 1), so as to identify that the Cancel Location is caused by that the UE changes from the 3GPP communication network to the non-3GPP communication network.

In Step F3, after receiving the cancel location message, the 3GPP communication network judges that the UE changes from the 3GPP communication network to the non-3GPP communication network according to the first indication information in the message, performs a session negotiation on the resource release process with the Serving GW, and releases the resources of the UE in the 3GPP.

In Step F4, after the Serving GW completes the session negotiation on the resource release process, if the releasing of the resources of the 3GPP communication network side in the PDN GW need to be notified by the Serving GW, the Serving GW performs the session negotiation with the PDN GW, so as to indicate the PDN GW to release the resources.

In Step F3, the process that the 3GPP communication network performs the session negotiation on the resource release process with the Serving GW and releases the resources of the UE in the 3GPP particularly includes the following steps.

In Step F301, after receiving the cancel location message, the Old SGSN of the first 3GPP communication network and the Old MME of the second 3GPP communication network detach the UE, and send a delete bearer request message or a delete PDP context request message to the Serving GW. The Old SGSN and the Old MME include the first indication information in the delete bearer request message or the delete PDP context request message, so as to indicate that the delete bearer request message or the delete PDP context request message is caused by that the UE changes from the 3GPP communication network to the non-3GPP communication network. A particular processing manner is described as follows.

The Cause IE is set to a specific cause value (for example, Inter RAT Change from 3GPP to non-3GPP), so as to indicate that the delete bearer request message or the delete PDP context request message is caused by that the UE changes from the 3GPP communication network to the non-3GPP communication network.

Alternatively, a specific indication bit IE (for example, Inter RAT Change from 3GPP to non-3GPP) is set, so as to indicate that the delete bearer request message or the delete PDP context request message is caused by that the UE changes from the 3GPP communication network to the non-3GPP communication network.

Alternatively, the Delete Type IE is set to a specific value (for example, 1), so as to indicate that the delete bearer request message or the delete PDP context request message is caused by that the UE changes from the 3GPP communication network to the non-3GPP communication network.

In Step F302, the Serving GW returns a delete bearer response or a delete PDP context response message to the Old MME and the Old SGSN.

After receiving the delete bearer request message or the delete PDP context request message sent from the Old SGSN and the Old MME, the Serving GW finds that the communication network of the UE changes from the 3GPP communication network to the non-3GPP communication network according to the first indication information, so as to release all the resources including user plane resources and control plane resources (including the control plane resources of the Serving GW towards the Old SGSN and the Old MME) of the UE.

In Step F4, the process that the Serving GW performs the session negotiation with the PDN GW, and indicates the PDN GW to release the resources particularly includes the following steps.

In Step F401, the Serving GW sends a message including the first indication information to the PDN GW, in which when interface protocol between the Serving GW and the PDN GW uses GTP protocol, the message is the delete bearer request, when the interface protocol between the Serving GW and the PDN GW uses PMIP protocol, the message is a proxy BU, and the Serving GW sets a Lifetime in the proxy BU message to 0. The first indication information indicates that the delete bearer request or the proxy BU message is caused by that the UE changes from the 3GPP communication network to the non-3GPP communication network. A particular processing manner for the first indication information is described as follows.

The Cause IE is set to a specific cause value (for example, Inter RAT Change from 3GPP to non-3GPP), so as to indicate that the process is caused by that the UE changes from the 3GPP communication network to the non-3GPP communication network.

Alternatively, a specific indication bit IE (for example, Inter RAT Change from 3GPP to non-3GPP) is set, so as to indicate that the process is caused by that the UE changes from the 3GPP communication network to the non-3GPP communication network.

Alternatively, the Delete Type or the Revocation Type IE is set to a specific value (for example, 1), so as to identify that the process is caused by that the UE changes from the 3GPP communication network to the non-3GPP communication network.

In Step F402, after receiving the message, the PDN GW deletes the resources of the UE in the old 3GPP communication networks (for example, a binding cache entry resource or a bearer context of the old 3GPP communication network), reserves the resources in the target non-3GPP communication network, and at the same time reserves resources assigned by the PDN GW for the UE, such as an IP address. The PDN GW returns a response message (for example, a delete bearer response or a proxy BA message) to the Serving GW.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

Figure 5:
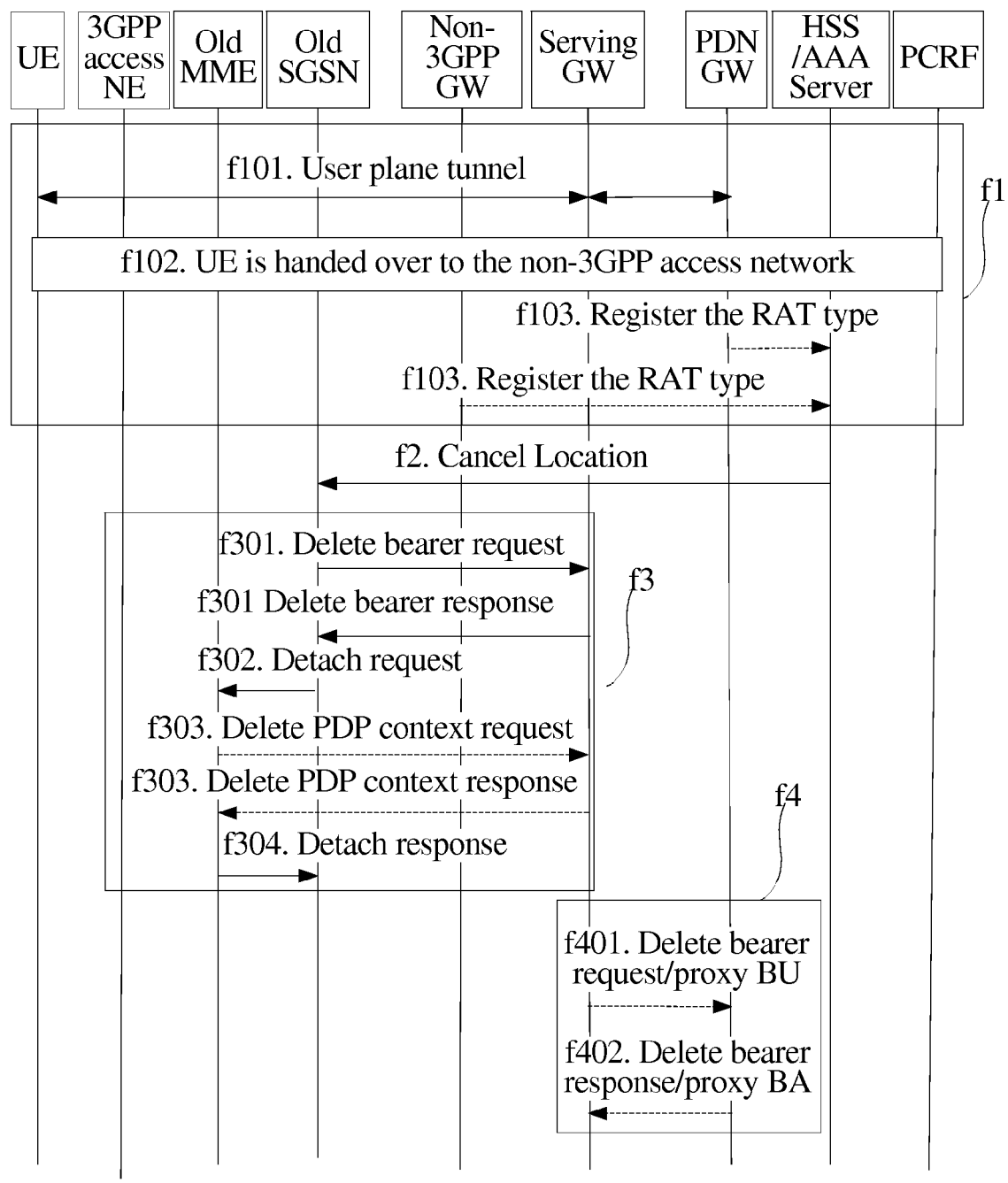
FIG. 5 is a flow chart of a fourth embodiment of the method of network resource release processing according to the present invention.

FIG. 5 is a flow chart of a fourth embodiment of the method of network resource release processing according to the present invention. Referring to FIG. 5, in this embodiment, a mobility management NE of a first 3GPP communication network is an Old SGSN, and a mobility management NE of a second 3GPP communication network is an Old MME. The method includes the following steps.

In Step f1, a UE performs a service process in the 3GPP communication network, and initiates an attach session negotiation procedure when moving from the 3GPP communication network to the non-3GPP communication network. The particular process is the same as the third embodiment as shown in FIG. 4, so it is not described here.

In Step f2, the HSS finds that an RAT Type of the UE changes to the RAT type of the non-3GPP communication network, the HSS decides to detach the UE from the Old MME of the second 3GPP communication network or the Old SGSN of the first 3GPP communication network, and sends a cancel location message to the Old MME of the second 3GPP communication network or the Old SGSN of the first 3GPP communication network. The HSS may include first indication information in the cancel location message. A particular manner of processing the first indication information is consistent with the description in Step F2 of the third embodiment, so it is not described here.

It should be noted that the processing process of sending the cancel location message including the first indication information to the Old MME of the second 3GPP communication network is the same as the process of sending the cancel location message including the first indication information to the Old SGSN of the first 3GPP communication network. In this embodiment, the process of sending the cancel location message including the first indication information to the Old SGSN of the first 3GPP communication network is set as an example for description.

In Step f3, after receiving the cancel location message, the Old SGSN of the first 3GPP communication network judges that the UE changes from the 3GPP communication network to the non-3GPP communication network according to the first indication information in the message, performs a session negotiation on the resource release process with the Serving GW, and releases the resources of the UE in the 3GPP. The Step f3 particularly includes the following steps.

In Step f301, the Old SGSN of the first 3GPP communication network sends a delete bearer request or a delete PDP context request message to the Serving GW, and includes the first indication information in the message to indicate that the delete bearer request or the delete PDP context request message is caused by that the UE changes from the 3GPP communication network to the non-3GPP communication network. The processing manner is the same as that in the third embodiment.

After receiving the delete bearer request or the delete PDP context request message, according to the first indication information, the Serving GW finds that the bearer delete is caused by that the UE changes from the 3GPP communication network to the non-3GPP communication network, and the Serving GW finds that the UE uses the ISR mechanism, the Serving GW then sends a delete bearer response or a delete PDP context response message to the Old SGSN, and performs the following processes.

The Serving GW releases all the resources including user plane resources and control plane resources (for example, the bearer context, the control plane resources of the Serving GW towards the Old MME of the second 3GPP communication network and towards the Old SGSN of the first 3GPP communication network) of the UE in the Serving GW, and the Old MME of the second 3GPP communication network needs not to notify the bearer resource release.

Alternatively, the Serving GW deactivates the ISR mechanism of the UE, and deletes the resources (for example, the control plane resource of the Serving GW towards the Old SGSN) relevant to the Old SGSN of the first 3GPP communication network in the Serving GW, but the Serving GW does not delete the bearer context used by the UE, and does not delete the control plane resource of the Serving GW towards the Old MME of the second 3GPP communication network, and the Serving GW releases all the resources (for example, the bearer context, the control plane resource of the Serving GW towards the Old MME) of the UE in the Serving GW after receiving the delete bearer request message sent from the Old MME of the second 3GPP communication network.

In Step f302, after receiving the Cancel Location message sent from the HSS in Step f2, if the Old SGSN of the first 3GPP communication network finds that the UE uses the ISR mechanism, the Old SGSN of the first 3GPP communication network decides to deactivate the ISR mechanism of the UE, and notifies the Old MME of the second 3GPP communication network to detach the user, and the Old SGSN sends a detach request message to the Old MME of the second 3GPP communication network. The Old SGSN may include the first indication information or second indication information in the detach request message. The particular manner of processing the first indication information is the same as the description in Step s302 of the second embodiment, so it is not described here.

The second indication information indicates that the detach request is caused by that the ISR mechanism of the UE is deactivated. The particular processing manner is the same as the description in Step s302 of the second embodiment, so it is not described here.

It should be noted that the Old SGSN may also send other messages to notify the Old MME to detach the user or release the resources, for example, the Old SGSN sends a delete resource request or a detach indication message to the Old MME to notify the Old MME to detach the user and release the resources.

In Step f303, after receiving the message, the Old MME of the second 3GPP communication network locally detaches the user and deletes the bearer context resource, and sets a state of the UE to an "EMM-DEREGISTERED" state. If the Old MME finds that the UE uses the ISR mechanism, the Old MME performs the following processes.

When the detach request message does not include the first indication information or the second indication information indicating that the detach request is caused by that the UE changes from the 3GPP communication network to the non-3GPP communication network or the ISR is deactivated, the Old MME sends the delete PDP context request (or the delete bearer request) message to the Serving GW.

Alternatively, when the detach request message includes the first indication information indicating that the detach request is caused by that the UE changes from the 3GPP communication network to the non-3GPP communication network or the ISR is deactivated, and the Serving GW releases all the resources without being notified by the Old MME of the resource release, the Old MME does not send the delete PDP context request (or the delete bearer request) message to the Serving GW.

Alternatively, when the detach request message includes the indication information indicating that the detach request is caused by that the UE changes from the 3GPP communication network to the non-3GPP communication network or the ISR is deactivated, and the Serving GW releases all the resources after being notified by the Old SGSN of the resource release, the Old MME sends the delete PDP context request (or the delete bearer request) message to the Serving GW.

In Step f304, the Old MME of the second 3GPP communication network returns a detach response message to the Old SGSN of the first 3GPP communication network.

In Step f4, after the Serving GW completes the session negotiation on the resource release process, if the releasing of the resources of the 3GPP communication network side in the PDN GW need to be notified by the Serving GW, the Serving GW performs the session negotiation with the PDN GW, and indicates the PDN GW to release the resources. The Step f4 particularly includes the following steps.

Steps f401-f402 are the same as Steps F401-F402 of the third embodiment, so they are not described here.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

Figure 6:
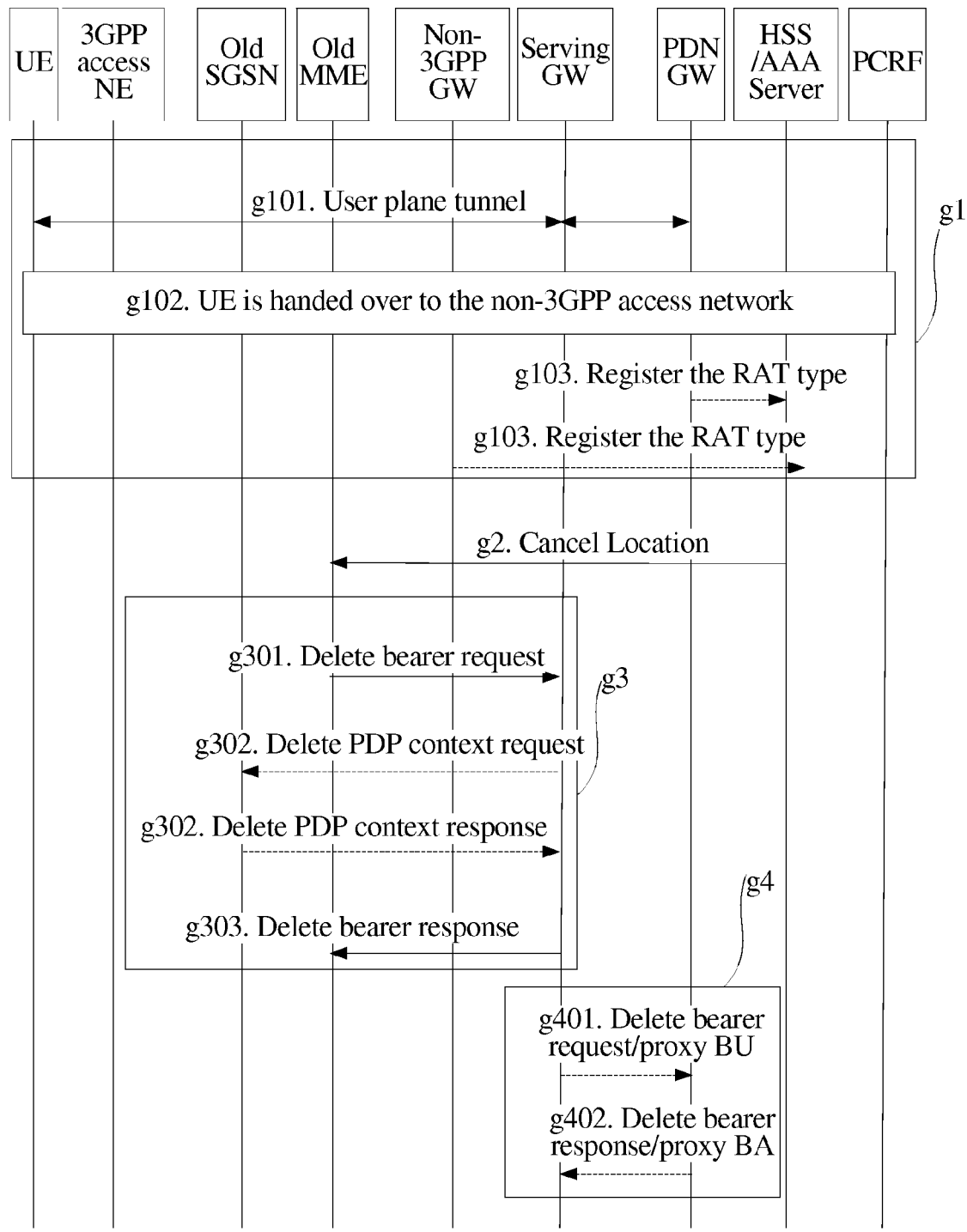
FIG. 6 is a flow chart of a fifth embodiment of the method of network resource release processing according to the present invention.

FIG. 6 is a flow chart of a fifth embodiment of the method of network resource release processing according to the present invention. Referring to FIG. 6, in this embodiment, a mobility management NE of a second 3GPP communication network is an Old SGSN, and a mobility management NE of a first 3GPP communication network is an Old MME. The method includes the following steps.

In Step g1, a UE performs a service process in the 3GPP network, and initiates an attach session negotiation procedure when moving from the 3GPP communication network to the non-3GPP communication network. The particular process is the same as the third embodiment as shown in FIG. 4, so it is not described here.

In Step g2, an HSS finds that an RAT Type of the UE changes to the RAT type of the non-3GPP communication network, the HSS decides to detach the UE from the Old MME or the Old SGSN, and sends a cancel location message to the Old MME of the first 3GPP communication network or the Old SGSN of the second 3GPP communication network in the 3GPP communication networks. The HSS may include first indication information in the cancel location message. A manner of processing the first indication information is consistent with the description in Step F2 of the third embodiment, so it is not described here.

It should be noted that the processing process of sending the cancel location message including the first indication information to the Old MME of the first 3GPP communication network is the same as the process of sending the cancel location message including the first indication information to the Old SGSN of the second 3GPP communication network. In this embodiment, the process of sending the cancel location message including the first indication information to the Old MME of the first 3GPP communication network is set as an example for description.

In Step g3, after receiving the cancel location message, the Old MME of the first 3GPP communication network judges that the UE changes from the 3GPP communication network to the non-3GPP communication network according to the first indication information in the message, performs a session negotiation on the resource release process with the Serving GW, and releases the resources of the UE in the 3GPP. The Step g3 particularly includes the following steps.

In Step g301, after receiving the cancel location message, the Old MME of the first 3GPP communication network sends a delete bearer PDP context request message or a delete PDP context request message to the Serving GW, and includes the first indication information in the message to indicate that the delete bearer request message or the delete PDP context request message is caused by that the UE changes from the 3GPP communication network to the non-3GPP communication network. The processing manner is the same as the description in Step F301 of the third embodiment, so it is not described here.

In Step g302, after receiving the delete bearer request message or the delete PDP context request message, according to the first indication information, the Serving GW finds that the bearer delete is caused by that the UE changes from the 3GPP communication network to the non-3GPP communication network, and the Serving GW finds that the UE uses the ISR mechanism, the Serving GW deactivates the ISR mechanism, and notifies the Old SGSN of the second 3GPP communication network to delete the bearer and detach the user. Particularly, the Serving GW sends the delete PDP context request message or the delete bearer request message to the Old SGSN of the second 3GPP communication network, the Serving GW may include the first indication information or second indication information in the message to indicate that the delete PDP context request message or the delete bearer request message is caused by that the UE changes from the 3GPP communication network to the non-3GPP communication network or the ISR mechanism of the UE is deactivated. The particular process is the same as the description in Step S301 of the first embodiment, and it is not described here.

After receiving the delete bearer request or the delete PDP context request message sent from the Serving GW, the Old SGSN of the second 3GPP communication network finds that the bearer delete is caused by that the UE changes from the 3GPP communication network to the non-3GPP communication network or the ISR mechanism of the UE is deactivated according to the first indication information or the second indication information, the Old SGSN may perform the following processes.

The UE is detached, and a state of the UE is set to an "EMM-DEREGISTERED" state.

If the state of the UE is an activated state or a connected state in the Old SGSN, the Old SGSN notifies the NE of the access network to release the resources (including a connection resource and a bearer resource), and returns a delete PDP context response message or a delete bearer response message to the Serving GW.

Alternatively, if the state of the UE is an idle state in the Old SGSN, the Old SGSN does not triggers a paging process, but directly locally deletes the resources, and returns the delete PDP context response message or the delete bearer response message to the Serving GW.

It should be noted that when the Serving GW does not include the first indication information or the second indication information in the delete bearer request message or the delete PDP context request message, and after the Old SGSN finds that all the bearers of the UE are requested to be released by the Serving GW, the Old SGSN considers that the bearer release is caused by that the UE changes from the 3GPP communication network to the non-3GPP network.

In Step g303, the Serving GW releases all the resources including user plane resources and control plane resources (including the control plane resources of the Serving GW towards the Old SGSN of the second 3GPP communication network and towards the Old MME of the first 3GPP communication network) of the UE, and returns the delete bearer response message or the delete PDP context response message to the Old MME.

In Step g4, after the Serving GW completes the session negotiation on the resource release process, if the releasing of the resources of the 3GPP communication network side in the PDN GW need to be notified by the Serving GW, the Serving GW performs the session negotiation with the PDN GW, and indicates the PDN GW to release the resources. Step g4 particularly includes the steps.

Steps g401-g402 are the same as Steps F401-F402 of the third embodiment, so they are not described here.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

In the manner 2.2, the non-3GPP communication network triggers the mobility management NE of the 3GPP communication network to send the delete bearer request message or the delete PDP context request message to the Serving GW.

Figure 7:
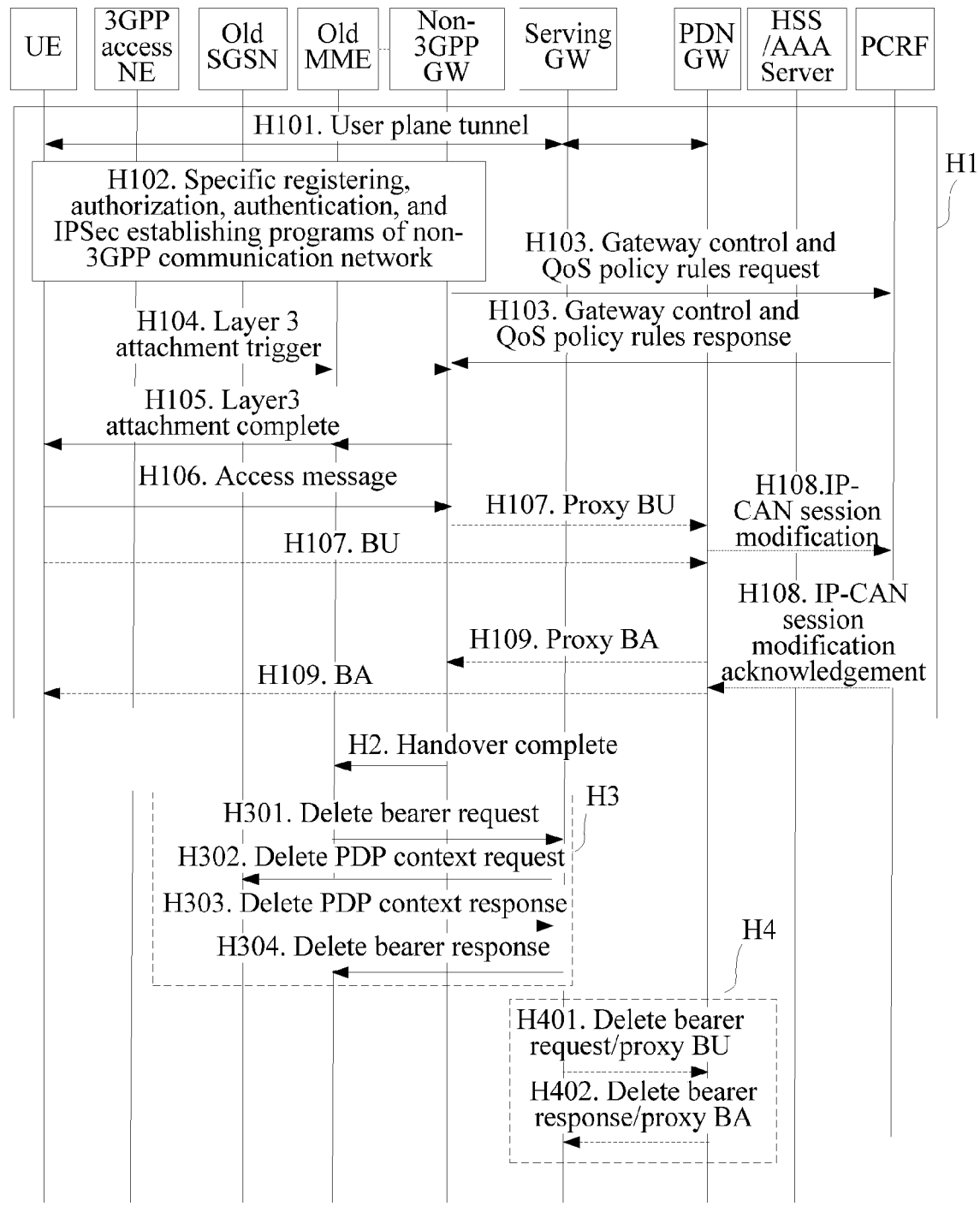
FIG. 7 is a flow chart of a sixth embodiment of the method of network resource release processing according to the present invention.

FIG. 7 is a flow chart of a sixth embodiment of the method of network resource release processing according to the present invention. Referring to FIG. 7, in this embodiment, a mobility management NE of a first 3GPP communication network is an Old MME, and a mobility management NE of a second 3GPP communication network is an Old SGSN. After a UE using an ISR mechanism changes from the 3GPP network mobile to a non-3GPP network, the US initiates an attachment procedure through the 3GPP network. Then, a resource release process is performed. The method includes the following steps.

In Step H1, the UE performs a service process in the 3GPP communication network, and initiates an attach session negotiation procedure.

In Step H2, after the attach negotiate is completed, a non-3GPP GW or a non-3GPP access NE of the non-3GPP communication network sends a handover complete message to the Old MME of the first 3GPP communication network or the Old SGSN of the second 3GPP communication network of the 3GPP communication networks. The process that the non-3GPP GW or the non-3GPP access NE sends the handover complete message to the Old MME of the first 3GPP communication network is the same as the process that the non-3GPP GW or the non-3GPP access NE sends the handover complete message to the Old SGSN of the second 3GPP communication network. In this embodiment, the process that the non-3GPP GW non-3GPP access NE sends the handover complete message to the Old MME of the first 3GPP communication network is set as an example for description.

In Step H3, after receiving the handover complete message, the 3GPP communication network performs a session negotiation on the resource release process with a Serving GW by sending a delete bearer request message or a delete PDP context request message including first indication information or third indication information, so as to release the resources. The first indication information is configured to indicate that a communication network of the UE changes from the 3GPP communication network to the non-3GPP communication network, and the third indication information indicates that the resource release process is caused by an optimized handover.

In Step H4, after the Serving GW completes the session negotiation on the resource release process, if the releasing of the resources of the 3GPP communication network side in a PDN GW need to be notified by the Serving GW, the Serving GW performs the session negotiation with the PDN GW, and indicates the PDN GW to release the resources.

Step H1 particularly includes the following steps.

In Step H101, the UE registers to the Old SGSN of the first 3GPP communication network and the Old MME of the first 3GPP communication network, uses the ISR mechanism between the Old SGSN and the Old MME, and performs the service process through the Serving GW and the PDN GW.

In Step H102, the UE performs a specific attachment procedure, and authorization and authentication programs of the non-3GPP communication network through the 3GPP communication network. If necessary, the UE executes an IP Security Protocol (IPSec) tunnel establishing procedure.

In Step H103, the non-3GPP GW sends a Gateway control and QoS policy rules request message to a PCRF to acquire a PCC rule used by the UE in the non-3GPP communication network.

The PCRF returns a Gateway control and QoS policy rules response message to the non-3GPP GW, in which the message includes the PCC rule used by the UE in the non-3GPP communication network.

In the step, for a WLAN system, the non-3GPP GW is an EPDG, for a WiMAX system, the non-3GPP GW is an ASN GW, for a CDMA system, the non-3GPP GW is an AGW, and for an HRPD network, the non-3GPP GW is a PDSN.

In Step H104, the UE triggers a Layer 3 attachment procedure through the 3GPP communication network.

In Step H105, the non-3GPP communication network completes the process of the Layer 3 attachment process, and returns a Layer 3 attach complete message to the UE through the 3GPP communication network.

In Step H106, the UE moves to the non-3GPP communication network, and sends an access message relevant to the non-3GPP communication network to the non-3GPP GW through the access NE in the non-3GPP communication network.

The process of Steps H107-H109 is the same as Steps S105-S107 in the first embodiment, so it is not described here.

Step H3 particularly includes the following steps.

In Step H301, after receiving the handover complete message sent from the non-3GPP network, the Old MME of the first 3GPP communication network sends the delete bearer request message or the delete PDP context request message including the first indication information to the Serving GW. The first indication information indicates that the delete bearer request message or the delete PDP context request message is caused by that the UE changes from the 3GPP communication network to the non-3GPP communication network. The particular process is the same as the description in Step F301 of the third embodiment, so it is not described here.

It should be noted that the Old MME of the first 3GPP communication network may include the third indication information in the delete bearer request message or the delete PDP context request message, so as to indicate that the delete bearer request message or the delete PDP context request message is caused by the optimized handover. The particular processing manner is described as follows.

A Cause IE is set to a specific cause value (for example, "Optimized Handover"), so as to indicate that the delete bearer request message or the delete PDP context request message is caused by the optimized handover.

Alternatively, a specific indication bit IE or an identity bit IE (for example, "Optimized Handover") is set, so as to indicate that the delete bearer request message or the delete PDP context request message is caused by the optimized handover.

Alternatively, a Delete Type IE is set to a specific value (for example, 3), so as to indicate that the delete bearer request message or the delete PDP context request message is caused by that the ISR mechanism of the UE is deactivated.

In Step H302, after receiving the delete bearer request message or the delete PDP context request message, according to the first indication information or the third indication information, the Serving GW finds that the bearer delete is caused by that the UE changes from the 3GPP communication network to the non-3GPP communication network or the optimized handover, and the Serving GW finds that the UE uses the ISR mechanism, the Serving GW deactivates the ISR mechanism, and notifies the Old SGSN of the second 3GPP communication network to delete the bearer and detach the user. The Serving GW sends the delete PDP context request message or the delete bearer request message including the first indication information to the Old SGSN of the second 3GPP communication network. For the particular manner of processing the first indication information, please refer to the description in Step S301 of the first embodiment. If the Serving GW does not include the indication information in the delete bearer request message or the delete PDP context request message, and after the Old SGSN finds that all bearers of the UE are requested to be released by the Serving GW, the Old SGSN considers that the bearer release is caused by that the UE changes from the 3GPP communication network to the non-3GPP communication network.

It should be noted that the Serving GW may include second indication information in the message, so as to indicate that the delete PDP context request message or the delete bearer request message is caused by that the ISR mechanism of the UE is deactivated. For the particular processing manner, please refer to the description in Step g302 of the fifth embodiment.

Alternatively, the Serving GW may also include the third indication information in the message, so as to indicate that the delete bearer request message or the delete PDP context request message is caused by the optimized handover. The particularly manner is described as follows.

The Cause IE is set to a specific cause value (for example, "Optimized Handover"), so as to indicate that the process is caused by the optimized handover.

Alternatively, a specific indication bit IE or an identity bit IE (for example, "Optimized Handover" or "Optimized Handover Flag") is set, so as to indicate that the delete bearer request message or the delete PDP context request message is caused by the optimized handover.

Alternatively, the Delete Type IE is set to a specific value (for example, 3), so as to indicate that the delete bearer request message or the delete PDP context request message is caused by that the optimized handover.

In Step H303, after receiving the delete bearer request or the delete PDP context request message sent from the Serving GW, according to the first indication information, the second indication information, or the third indication information, the Old SGSN of the second 3GPP communication network finds that the bearer delete is caused by that the UE changes from the 3GPP communication network to the non-3GPP communication network, or is caused by the optimized handover, or is caused by that the ISR mechanism of the UE is deactivated. The process of the Old SGSN is the same as the process of the Old SGSN in Step g302 of the fifth embodiment, so it is not described here.

It should be noted that when the Serving GW does not include the first indication information, the second indication information, or the third indication information in the delete bearer request message or the delete PDP context request message, and after the Old SGSN finds that all the bearers of the UE are requested to be released by the Serving GW, the Old SGSN considers that the bearer release is caused by that the UE changes from the 3GPP communication network to the non-3GPP network.

In Step H304, the Serving GW releases all the resources including user plane resources and control plane resources (including the control plane resources of the Serving GW towards the Old SGSN and the Old MME) of the UE, and returns a delete bearer response message or a delete PDP context response message to the Old MME.

In Step H4, the process that the Serving GW notifies the PDN GW to release the resources particularly includes the following steps.

In Step H401, the Serving GW sends a message including the first indication information or the third indication information to the PDN GW, in which when interface protocol between the Serving GW and the PDN GW uses GTP protocol, the message is the delete bearer request, when the interface protocol between the Serving GW and the PDN GW uses PMIP protocol, the message is a proxy BU, and the Serving GW sets a Lifetime in the proxy BU message to 0. The first indication information indicates that the delete bearer request or the proxy BU is caused by that the UE changes from the 3GPP communication network to the non-3GPP communication network. A particular process of the indication bit is the same as the process in Step F4 of the third embodiment, Step f4 of the fourth embodiment, and Step g4 of the fifth embodiment, so it is not described here.

The Serving GW may also include the third indication information in the message, so as to indicate that the delete bearer request message or the proxy BU message is caused by the optimized handover. The particular processing manner is described as follows.

The Cause IE is set to a specific cause value (for example, "Optimized Handover"), so as to indicate that the process is caused by that the optimized handover.

Alternatively, the specific indication bit or the identity bit IE (for example, "Optimized Handover" or "Optimized Handover Flag") is set, so as to indicate that the delete bearer request message or the proxy BU message is caused by the optimized handover.

Alternatively, the Delete Type or the an Update Type IE is set to a specific value (for example, 3), so as to represent that the delete bearer request message or the proxy BU message is caused by the optimized handover.

In Step H402, after receiving the message, the PDN GW deletes the resources of the UE in the old 3GPP communication network (for example, a binding cache entry resource or a bearer context of the old 3GPP communication network), reserves the resources in the target non-3GPP communication network, and at the same time reserves resources assigned by the PDN GW for the UE, such as an IP address. The PDN GW returns a response message (for example, a delete bearer response or a proxy BA message) to the Serving GW.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

Figure 8:
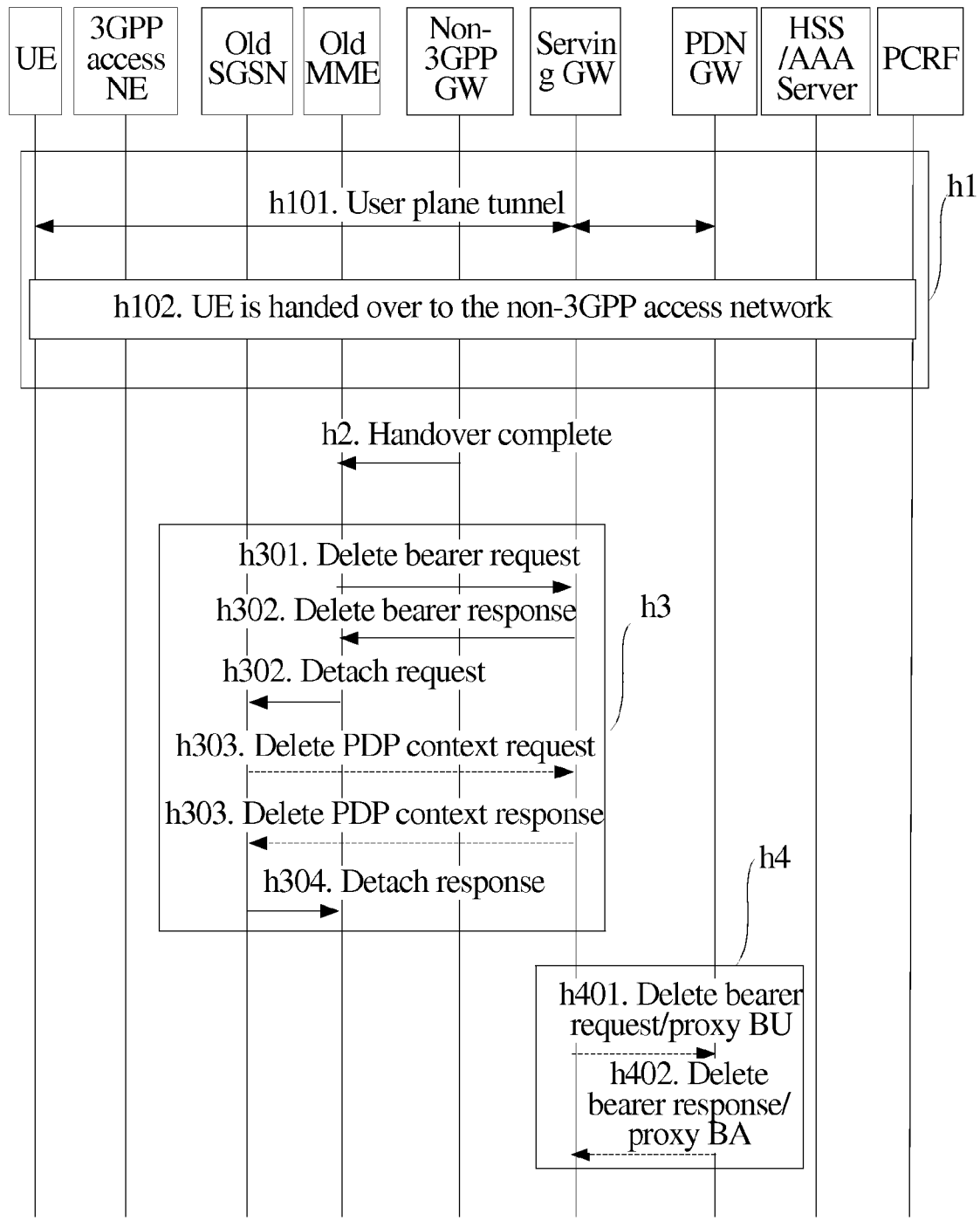
FIG. 8 is a flow chart of a seventh embodiment of the method of network resource release processing according to the present invention.

FIG. 8 is a flow chart of a seventh embodiment of the method of network resource release processing according to the present invention. Referring to FIG. 8, in this embodiment, a mobility management NE of a first 3GPP communication network is an Old MME, and a mobility management NE of a second 3GPP communication network is an Old SGSN. After a UE using an ISR mechanism changes from the 3GPP network mobile to a non-3GPP network, the US initiates an attachment procedure through the 3GPP network. Then, a resource release process is performed. The method includes the following steps.

In Step h1, the UE performs a service process in the 3GPP communication network, and initiates an attach session negotiation procedure through the 3GPP communication network. The particular processing procedure is the same as Step H1 in the sixth embodiment, so it is not described here.

In Step h2, after the attach negotiate is completed, a non-3GPP GW or a non-3GPP access NE of the non-3GPP communication network sends a handover complete message to the Old MME of the first 3GPP communication network or the Old SGSN of the second 3GPP communication network of the 3GPP communication networks. The process that the non-3GPP GW or the non-3GPP access NE sends the handover complete message to the Old MME of the first 3GPP communication network is the same as the process that the non-3GPP GW or the non-3GPP access NE sends the handover complete message to the Old SGSN of the second 3GPP communication network. In this embodiment, the process that the non-3GPP GW non-3GPP access NE sends the handover complete message to the Old MME of the first 3GPP communication network is set as an example for description.

In Step h3, after receiving the handover complete message, the Old MME of the first 3GPP communication network performs a session negotiation on the resource release process with a Serving GW by sending a delete bearer request message or a delete PDP context request message including first indication information or third indication information, so as to release the resources. The first indication information is configured to indicate that a communication network of the UE changes from the 3GPP communication network to the non-3GPP communication network, and the third indication information indicates that the resource release process is caused by an optimized handover.

In Step h4, after the Serving GW completes the session negotiation on the resource release process, if the releasing of the resources of the 3GPP communication network side in a PDN GW need to be notified by the Serving GW, the Serving GW performs the session negotiation with the PDN GW, so as to indicate the PDN GW to release the resources. The process is the same as the process in Step H4 of the sixth embodiment, so it is not described here.

Step h3 particularly includes the following steps.

In Step h301, after receiving the handover complete message, the Old MME of the first 3GPP communication network sends the delete bearer request message or the delete PDP context request message to the Serving GW.

The Old MME includes the first indication information in the message, so as to indicate that the delete bearer request message or the delete PDP context request message is caused by that the UE changes from the 3GPP communication network to the non-3GPP communication network. The particular process is the same as the description in Step F301 of the third embodiment, so it is not described here.

It should be noted that the Old MME may include the third indication information in the message, so as to indicate that the delete bearer request message or the delete PDP context request message is caused by the optimized handover. For the particular process, please refer to the description in Step H301 of the sixth embodiment, so it is not described here.

After receiving the delete bearer request message or the delete PDP context request message, according to the first indication information or the third indication information, the Serving GW finds that the bearer delete is caused by that the UE changes from the 3GPP communication network to the non-3GPP communication network or the optimized handover, and the Serving GW finds that the UE uses the ISR mechanism, the Serving GW then processes in the following manners.

The Serving GW releases all the resources including user plane resources and control plane resources (including the bearer context, and the control plane resources of the Serving GW towards the Old MME of the first 3GPP communication network and the Old SGSN of the second 3GPP communication network) of the UE in the Serving GW, and the Old SGSN needs not to notify the bearer resource release.

Alternatively, the Serving GW deactivates the ISR mechanism of the UE, and deletes the resources (for example, the control plane resource of the Serving GW towards the Old MME) in the Serving GW relevant to the Old MME, but the Serving GW does not delete the bearer context used by the UE, and does not delete the control plane resource of the Serving GW towards the Old SGSN. The Serving GW releases all the resources (for example, the bearer context and the control plane resource of the Serving GW towards the Old SGSN) of the UE in the Serving GW after receiving the delete bearer request message or the delete PDP context request message sent from the Old SGSN.

Alternatively, in Step h302, after receiving the handover complete message sent from the NE in the non-3GPP communication network in Step h2, when the Old MME of the first 3GPP communication network finds that the UE uses the ISR mechanism, the Old MME decides to deactivate the ISR mechanism of the UE, notifies the Old SGSN of the second 3GPP communication network to detach the user, and sends a detach request message to the Old SGSN of the second 3GPP communication network.

The Old MME may include the first indication information in the detach request message, so as to indicate that the detach request message is caused by that the UE changes from the 3GPP communication network to the non-3GPP communication network. For the particular process, please refer to the description in Step s302 of the second embodiment, so it is not described here.

It should be noted that the Old MME may include second indication information in the detach request message, so as to indicate that the detach request message is caused by that the ISR mechanism of the UE is deactivated. For the particular process, please refer to the description of Step s302 in the second embodiment, so it is not described here. The Old MME may also include the third indication information in the message, so as to indicate that the detach request message is caused by the optimized handover. The particular process may be described as follows.

A Cause IE is set to a specific cause value (for example, "Optimized Handover"), so as to indicate that the detach request message is caused by the optimized handover.

Alternatively, a specific indication bit IE or an identity bit IE (for example, "Optimized Handover" or "Optimized Handover Flag") is set, so as to indicate that the detach request message is caused by the optimized handover.

Alternatively, a Delete Type IE is set to a specific value (for example, 3), so as to indicate that the detach request message is caused by the optimized handover.

It should be noted that the Old MME may send other messages to notify the Old SGSN to detach the user and release the resources, for example, the Old MME sends a delete resource request or a detach indication message to the Old SGSN to notify the Old SGSN to detach the user and release the resources.

In Step h303, after receiving the detach message, the Old MME locally detaches the user and deletes a bearer context resource, and sets a state of the UE to an "EMM-DEREGISTERED" state. If the Old MME finds that the UE uses the ISR mechanism, the Old MME may perform the following processes.

When the detach request message does not include the first indication information, the second indication information, or the third indication information indicating that the detach request is caused by that the UE changes from the 3GPP communication network to the non-3GPP communication network, or is caused by that the ISR is deactivated, or is caused by the optimized handover, the Old MME sends the delete PDP context request (or the delete bearer request) message to the Serving GW.

Alternatively, when the detach request message includes the first indication information, the second indication information, or the third indication information indicating that the detach request is caused by that the UE changes from the 3GPP communication network to the non-3GPP communication network, or is caused by the optimized handover, or is caused by that the ISR is deactivated, and the Serving GW releases all the resources without being notified by the Old MME of the resource release, the Old MME does not send the delete PDP context request (or the delete bearer request) message to the Serving GW.

Alternatively, when the detach request message includes the first indication information, the second indication information, or the third indication information indicating that the detach request is caused by that the UE changes from the 3GPP communication network to the non-3GPP communication network, is caused by the optimized handover, or is caused by that the ISR is deactivated, and the Serving GW releases all the resources after being notified by the Old MME of the resource release, the Old MME sends the delete PDP context request (or the delete bearer request) message to the Serving GW.

In Step h304, the Old MME returns a detach response message to the Old SGSN.

In the steps, if the Old SGSN or the Old MME finds that the UE registers to an MSC, when the MME or the SGSN detaches the UE, and the detaching of the UE is caused by that the UE changes from the 3GPP communication network to the non-3GPP communication network, the Old SGSN or the Old MME sends an IMSI detach indication message to the MSC, so as to indicate the MSC to detach the UE.

Based on the session negotiation on the resource release process between the Serving GW and the 3GPP communication network triggered by the non-3GPP network, the resources are released when the user using the ISR mechanism in the 3GPP communication network is handed over to the non-3GPP communication network, the existing relevant NEs need to be modified, and functions need to be expanded.

Figure 9:
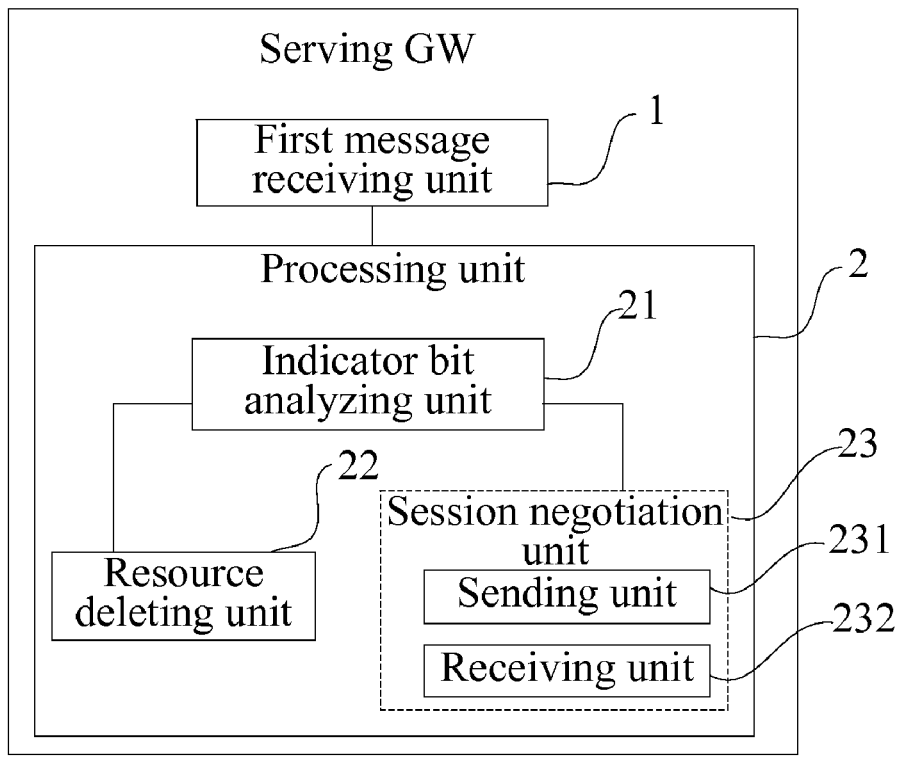
FIG. 9 is a schematic structural view of a Serving GW according to an embodiment of the present invention.

Referring to FIG. 9, a Serving GW according to the present invention is shown, which includes a first message receiving unit 1 and a processing unit 2.

The first message receiving unit 1 is configured to receive a message including indication information sent from a peer endpoint NE (including a PDN GW, an Old MME, or an Old SGSN).

The processing unit 2 is configured to delete network resources established by 3GPP communication networks for a UE according to the message received by the first message receiving unit 1.

The processing unit 2 includes an indication bit analyzing unit 21, a resource deleting unit 22, and a session negotiation unit 23.

The indication bit analyzing unit 21 is configured to judge whether to delete the network resources established by the 3GPP access networks for the UE according to the indication information in the message received by the first message receiving unit 1.

The resource deleting unit 22 is configured to delete the network resources established by the 3GPP communication networks for the UE on the Serving GW, when an analysis result of the indication bit analyzing unit 21 is yes.

The session negotiation unit 23 is configured to notify mobility management NEs of the 3GPP communication networks to release the network resources established for the UE when the analysis result of the indication bit analyzing unit 21 is yes.

The session negotiation unit 23 includes a sending unit 231 and a receiving unit 232.

The sending unit 231 is configured to send a delete bearer request message or a delete PDP context request message to the mobility management NEs of the 3GPP communication networks, so as to notify the mobility management NEs to release the resources.

The receiving unit 232 is configured to receive a delete bearer response message or a delete PDP context response message returned from the mobility management NEs.

In this embodiment, the indication information includes first indication information, second indication information, or third indication information.

The first indication information is configured to indicate that a communication network of the UE changes from the 3GPP communication network change to a non-3GPP communication network.

The second indication information is configured to indicate that an ISR of the UE is deactivated.

The third indication information is configured to indicate an optimized handover.

The message sent from the peer endpoint NE includes a delete bearer request message or a binding revocation indication message sent from a PDN GW; or the delete bearer request message or the delete PDP context request message sent from the mobility management NEs of the 3GPP communication networks.

Figure 10:
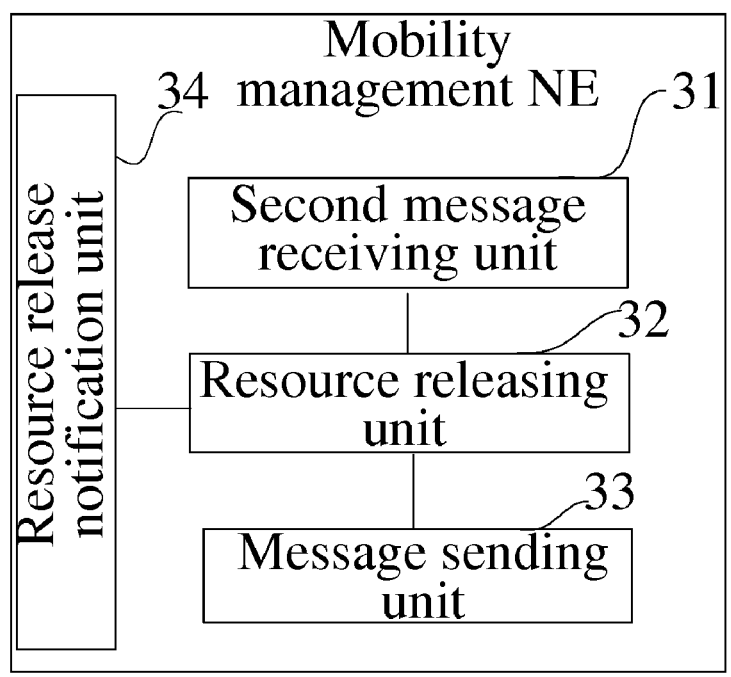
FIG. 10 is a schematic structural view of a mobility management NE according to an embodiment of the present invention.

Referring to FIG. 10, a mobility management NE according to the present invention is shown, which includes a second message receiving unit 31, a resource releasing unit 32, and a message sending unit 33.

The second message receiving unit 31 is configured to receive a cancel location message sent from an HSS or a handover complete message sent from a non-3GPP communication network, in which the cancel location message may include first indication information, so as to indicate that a communication network of a UE changes from a 3GPP communication network to the non-3GPP communication network.

The resource releasing unit 32 is configured to release resources established by the 3GPP communication networks for the UE after the second message receiving unit 31 receives the cancel location message or the handover complete message.

The message sending unit 33 is configured to send a message including indication information to a Serving GW, and notify the Serving GW to release the resources.

In another embodiment of the present invention, the mobility management NE further includes a resource release notification unit 34.

The resource release notification unit 34 is configured to notify a mobility management NE of the other 3GPP communication network to release the network resources established for the UE. A detach request message may include first indication information, second indication information, or third indication information. The first indication information is configured to indicate that the communication network of the UE changes from the 3GPP communication network to the non-3GPP communication network, the second indication information is configured to indicate that an ISR of the UE is deactivated, and the third indication information is configured to indicate an optimized handover.

In this embodiment, the indication information includes the first indication information, the second indication information, or the third indication information.

The first indication information is configured to indicate that the communication network of the UE changes from the 3GPP communication network change to the non-3GPP communication network.

The second indication information is configured to indicate that the ISR of the UE is deactivated.

The third indication information is configured to indicate the optimized handover.

In this embodiment, the message including the indication information is a delete bearer request message or a delete PDP context request message.

It should be noted that the mobility management NE according to the embodiments of the present invention is the MME or the SGSN.

Through the method of resource release processing and the relevant devices according to the embodiments of the present invention, the request message includes the indication information indicating that the UE using the ISR mechanism changes or is handed over from the 3GPP communication network to the non-3GPP communication network, so as to indicate the corresponding NEs to perform the processes, such that the problem of the prior art that the user using the ISR mechanism cannot perform processes after moving from the 3GPP communication network to the non-3GPP communication network is solved, and the old network resources are released when the UE using the ISR mechanism changes from the 3GPP communication network to the non-3GPP communication network, thereby improving a system processing capability and ensuring a quality of service (QoS) of the user.

The above descriptions are merely preferred embodiments of the present invention. It should be noted by persons of ordinary skill in the art that modifications and improvements may be made without departing from the principle of the present invention, which should be construed as falling within the scope of the present invention.

What is claimed is:

1. A method of network resource release processing, comprising:
   registering user equipment (UE) using idle mode signaling reduction (ISR) mechanism to two 3rd Generation Partnership Project (3GPP) communication networks;
   receiving, by a serving gateway (Serving GW), a message sent from a peer endpoint network element (NE), when the UE changes from the 3GPP network to a non-3GPP network;

wherein the receiving, by the Serving GW, the message sent from the peer endpoint NE comprises: receiving, by the Serving GW, a delete bearer request message or a binding revocation indication message sent from a packet data network gateway (PDN GW), wherein the delete bearer request message or the binding revocation indication message includes first indication information indicating that a communication network of the UE changes from the 3GPP communication network to the non-3GPP communication network; and deleting network resources established by the two 3GPP communication networks for the UE according to the message, wherein the deleting the network resources established by the two 3GPP communication networks for the UE comprises: (a) sending, by the Serving GW, the delete bearer request message or a delete PDP context request message to notify a mobility management NE of one of the two 3GPP communication networks to release the network resources established for the UE; and (b) receiving, by the mobility management NE of the 3GPP communication network, the delete bearer request message or the delete PDP context request message, deleting the resources used by the UE, and sending a message to notify a mobility management NE of the other 3GPP communication network to release the resources.

2. The method according to claim 1, wherein the releasing the resources used by the UE comprises:

detaching, by the mobility management NEs of the 3GPP communication networks, the UE.

3. The method according to claim 1, wherein the releasing the resources used by the UE comprises:

notifying, by the mobility management NEs of the 3GPP communication networks, a mobile switching center (MSC) to detach the UE.

4. A method of network resource release processing, comprising:

registering user equipment (UE) using idle mode signaling reduction (ISR) mechanism to two 3rd Generation Partnership Project (3GPP) communication networks;

receiving, by a serving gateway (Serving GW), a message sent from a peer endpoint network element (NE), when the UE changes from the 3GPP network to a non-3GPP network;

deleting network resources established by the two 3GPP communication networks for the UE according to the message;

sending, by the non-3GPP communication network, a handover complete message to a mobility management NE of one communication network;

receiving, by the Serving GW, a delete bearer request message or a delete PDP context request message sent from a mobility management NE of one of the two 3GPP communication networks; and sending the delete bearer request message or the delete PDP context request message to a mobility management NE of the other 3GPP communication network to notify the mobility management NE to release the network resources established for the UE.

* * * * *